United States Patent [19]
Contreras Orellana

[11] Patent Number: 5,197,434
[45] Date of Patent: Mar. 30, 1993

[54] I.C. ENGINES

[75] Inventor: Ariel P. Contreras Orellana, Buenos Aires, Argentina

[73] Assignee: Jaime Suquet, Adrogue, Argentina; a part interest

[21] Appl. No.: 577,309

[22] Filed: Sep. 4, 1990

[30] Foreign Application Priority Data

Sep. 1, 1989 [AR] Argentina ............... 314828

[51] Int. Cl.[5] ............................................. F02B 75/00
[52] U.S. Cl. ................. 123/433; 123/65 BA; 123/190.4
[58] Field of Search ............. 123/193 C, 433, 190 B, 123/190 BF, 65 BA, 65 A

[56] References Cited

U.S. PATENT DOCUMENTS

| | | | |
|---|---|---|---|
| 2,088,923 | 8/1937 | Rafailoff | 123/433 |
| 2,789,547 | 4/1957 | Mallory | 123/433 |
| 3,092,089 | 6/1963 | Dolza | 123/433 |
| 4,084,556 | 4/1978 | Villella | 123/433 |
| 4,177,772 | 12/1979 | Franke | 123/433 |

FOREIGN PATENT DOCUMENTS

| | | |
|---|---|---|
| 3315783 | 11/1983 | Fed. Rep. of Germany . |
| 591377 | 4/1925 | France . |
| 636986 | 4/1928 | France . |
| 0126424 | 7/1983 | Japan ................... 123/433 |
| 0544446 | 4/1942 | United Kingdom ............... 123/433 |

Primary Examiner—E. Rollins Cross
Assistant Examiner—M. Macy
Attorney, Agent, or Firm—Oblon, Spivak, McClelland, Maier & Neustadt

[57] ABSTRACT

A four-stroke internal combustion engine for the otto and diesel cycle, characterized by incorporating a valve distribution for engines that use one or more ports near Bottom Dead Center. The four-stroke internal combustion engine comprises one or more cylinders each with a piston movable therein to define a combustion chamber and a port provided in a wall of each cylinder. The port is openable independently of an inlet valve and an exhaust valve to provide an additional route for the discharge of air or fuel/air mixture.

11 Claims, 20 Drawing Sheets

C: STROKE
D: BORE

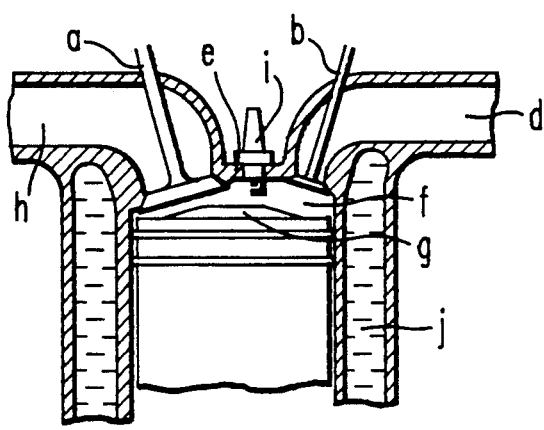
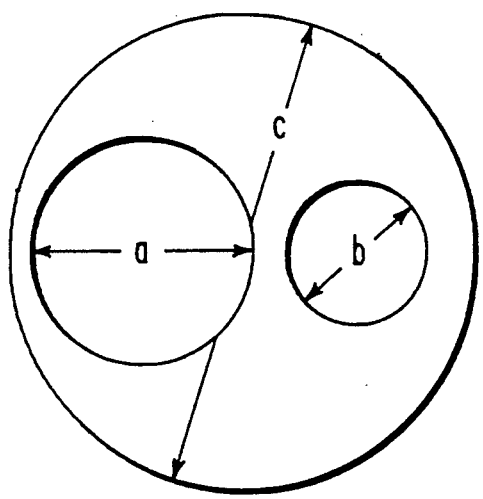
FIG. 9
FIG. 10
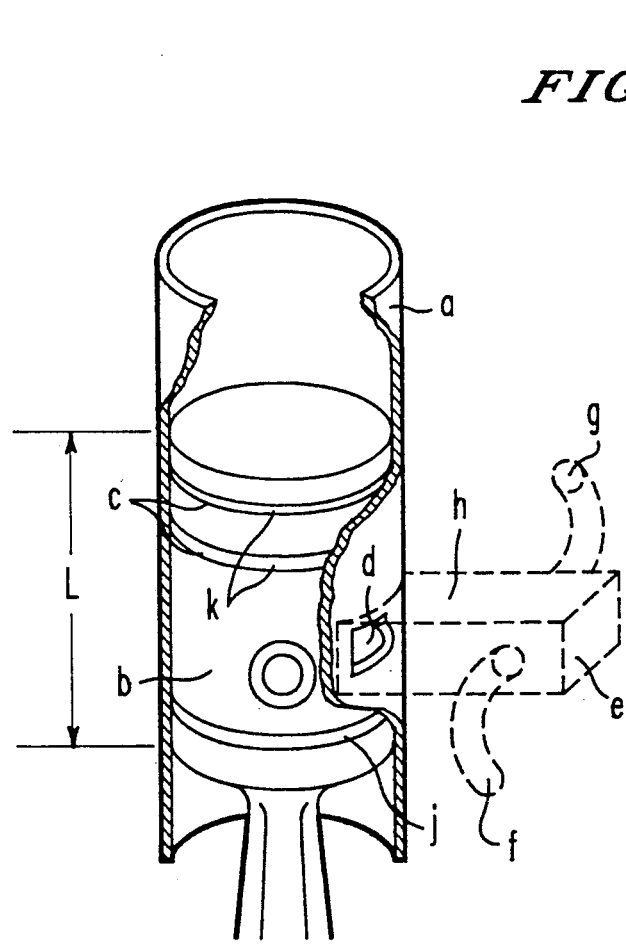
FIG. 8
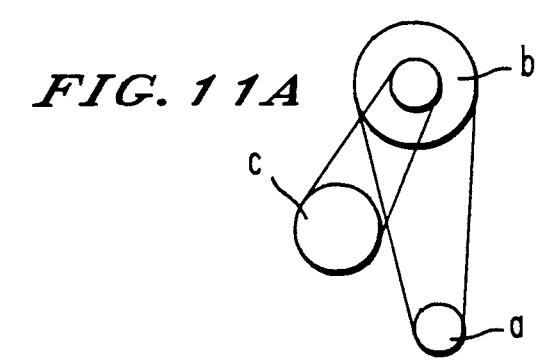
FIG. 11A
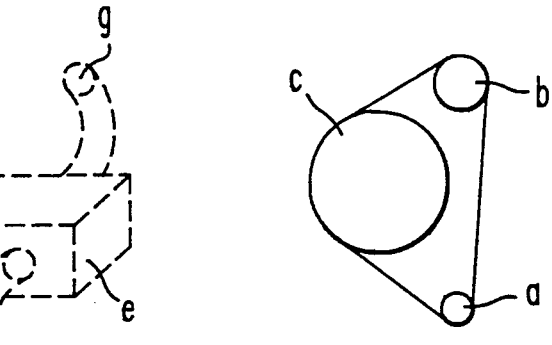
FIG. 11B
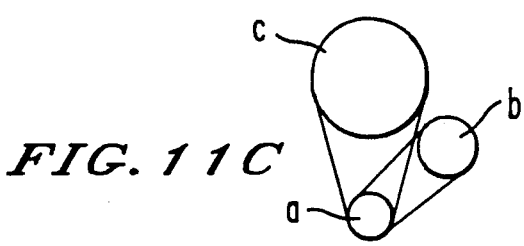
FIG. 11C

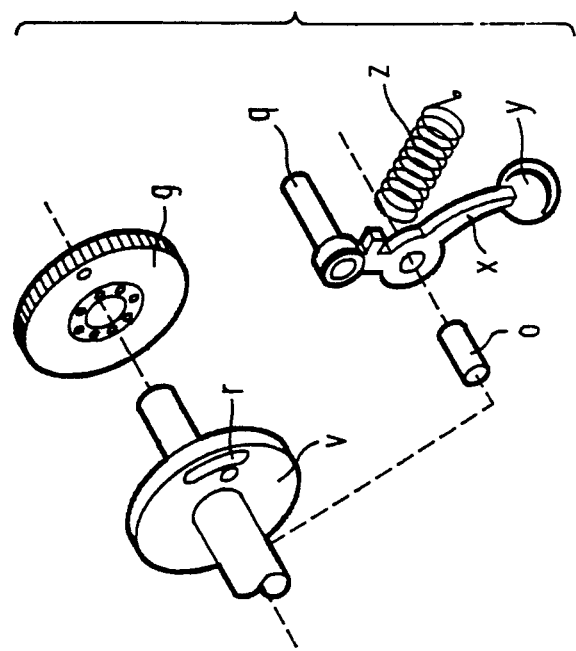
FIG.29
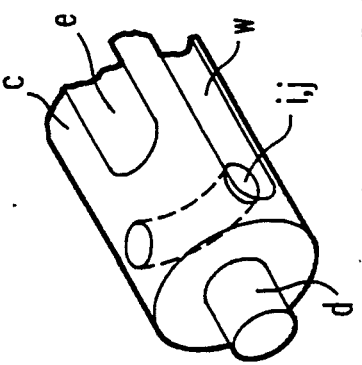
FIG.28
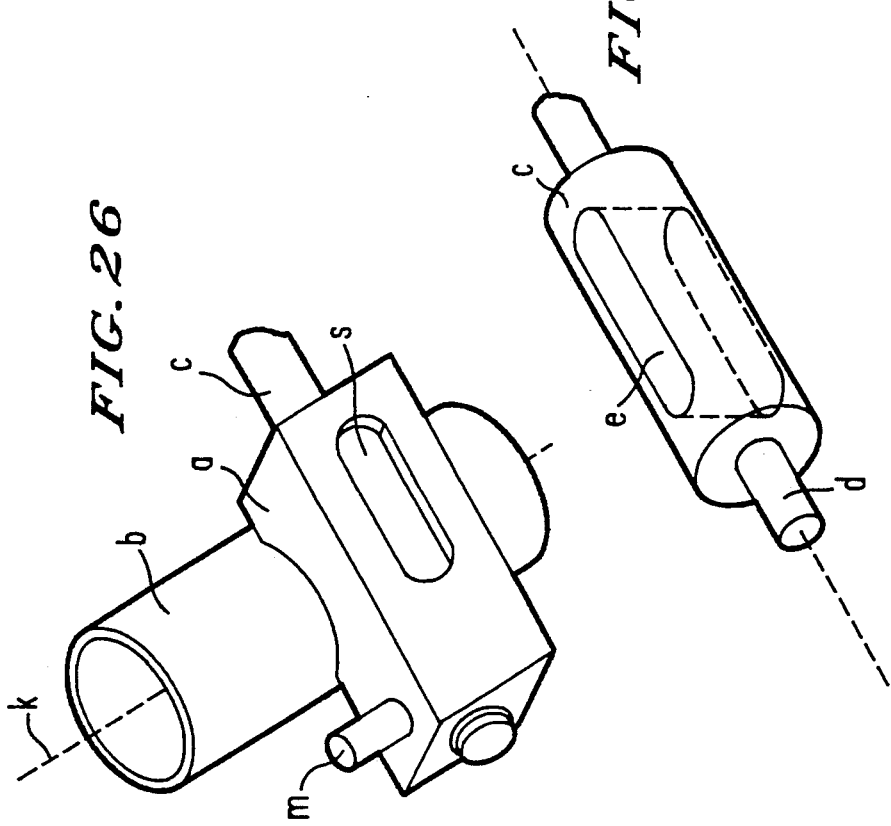
FIG.27
FIG.26

I.C. ENGINES

BACKGROUND OF THE INVENTION

1. Field of the Invention

This invention relates to I.C. engines, particularly four-stroke I.C. engines employing the Otto or Diesel cycles.

Practical I.C. engines cannot approach the thermal efficiency of the ideal Carnot engine (whose theoretical thermal efficiency is from 77 to 82 percent) due to several well-known factors.

In this invention we have been interested primarily in losses occurring in relation to, particularly inside, the cylinders, and in their effects upon the work done by the engine.

The principal losses are as follows:

a) Losses due to pumping, windage and induction

During the induction stroke in particular (in which the depression arising in the cylinder slows the piston), losses are considerable. These losses increase as engine speed (RPM) increases.

b) Losses due to distribution adjustment or exhaust

It is known that scavenging of combustion gases in the exhaust stroke involves overcoming a greater than atmospheric pressure, even with the exhaust valve fully open. This prevents complete expulsion of the combustion gases from the cylinder and causes a corresponding decrease in performance.

c) Cooling losses

These quantitatively important losses are intentionally caused so that the engine is kept within an optimal temperature range dictated by material constraints. Most of this energy is dissipated by the engine's cooling system.

By way of background to the invention, reference will now be made to FIGS. 1 to 7 of the accompanying drawings, which summarize some of the history of I.C. engine technology.

Initially, engines were built with a long stroke and with only one large cylinder and piston, with the purpose of maximum use of gas pressure. These engines were economic but their rotational speed was limited by the large moving masses.

The prevailing aim initially was to maintain valve timing as near as possible to the ideal cycle; however, this led to poor power to weight ratios.

In time, development led to the multiplication of cylinders to allow higher RPM, and therefore more power, by decreasing the size of the moving masses.

In an early vehicle engine, shown in FIG. 1, the valves (a) are located beside the cylinder (b) and are directly moved by a camshaft (c) located near the crankshaft. The combustion chamber (d) situated over the valve heads (e) is offset with respect to the cylinder. The very sharp curves of the gas ducts (f) communicating with the combustion chamber slow the intake and exhaust gas flows. Moreover, the flame front, during expansion, is not centered over the piston (g). For these reasons the engine suffers from low efficiency. Nevertheless, this type of engine is still used in building heavy work machines, due to its economic manufacture.

In later engines, as shown in FIG. 2, performance was improved by aligning the combustion chamber (a) with the piston head (b), which requires that the valves (c) are inverted and situated in the cylinder head (d); the so-called overhead valve (OHV) arrangement. This requires a more complex push rod mechanism (e) to operate the valves. The combustion chamber has to be smaller to obtain higher compression ratios, which reduces the size of the valves (c), but the advantage is that the gas ducts (f) are straighter and so gas flow is improved, obtaining a remarkable performance increase.

As even better performance was sought, the compression ratio was increased still further. There was also a need to increase valve diameter, which led to the development of a hemispherical or 'pent-roof' combustion chamber, as shown in FIG. 3, in which inlet and exhaust valves (b and c) are inclined. This allows the inlet and exhaust ducts (d and e) to be straighter and to have an increased cross-sectional area. Additionally, the flame front is centered with respect to the piston by virtue of the central location of the spark plug (L).

In the construction illustrated in FIG. 3, camshafts (f and g) are situated in or over the cylinder head (h) to act directly upon the valves. Engines of this overhead camshaft (OHC) type are now in widespread use, particularly in sports cars and motorcycles. Other engines have the camshaft below the valves but with the valve actuation mechanism arranged in such a way that the valves can operate at an angle.

Another system used in some engines, as shown in FIG. 4, has a valve (a) in the cylinder head (b) and another (c) in the block (d). This partly solves the problems outlined above. These engines, designed with a long stroke, are quite efficient, have a satisfactory RPM limit, and are mostly used in alternative vehicles.

At the same time as progress was being made on the cylinder head, the piston stroke was modified step-by-step as engines became more efficient. The first engine designs and constructions almost always had a long stroke (FIG. 5), i.e., were substantially 'undersquare' but afterwards the stroke began to shorten. Thus, less gas entered and left the cylinder per cycle, allowing RPM to be increased. In due course, engines approached a medium stroke (FIG. 6) as the stroke approached the bore. This approximately 'square' configuration, adopted by most current engines, allows satisfactory performance, a clean exhaust and substantially complete combustion. Then, however, the need for smaller, more powerful engines initiated a series of short-stroke 'oversquare' engines (FIG. 7) that reduced the moving mass even more (allowing increased RPM) but as a negative side effect, gave poor emissions performance.

The valve distribution diagrams for each stroke arrangement are shown at the feet of FIGS. 5, 6 and 7. It can be seen that valve overlap is always symmetrical and that it increases as stroke decreases.

The next efforts to improve efficiency were centered upon, for example, the addition of fuel injection, increasing the number of valves per cylinder, and forced induction, whether by turbocharger or supercharger. Not many attempts, however, were made to redesign the engine's basic structure.

In summary, it can be pointed out that the most satisfactory engine structure is the one depicted in FIG. 3 having the strokes of FIGS. 6 or 7.

Until now, many problems remain unsolved. For instance:

a) heat removal;

b) the sensitivity of materials to high temperatures;

c) structural complexity, leading to difficulty in manufacture;

d) weight reduction with respective to effective power; and e) optimizing thermal efficiency.

SUMMARY OF THE INVENTION

The objects of this invention are as follows:

A. To develop a new induction and/or exhaust system that complements and modifies the conventional valve system of four stroke internal combustion engines operating according to the Otto and Diesel cycles;

B. In particular, to establish several basic embodiments that implement the invention;

C. To improve significantly the thermal balance of these engines;

D. To reduce the cost and the weight of an engine for a given power output by changing the size of its critical mechanical parts; and E. To design new engines returning to long strokes that permit more complete combustion and the maximum use of fuel.

The present invention modifies the Carnot cycle in such a way that the thermal performance of four-stroke Otto or Diesel engines is greatly improved.

We have found that putting valves in communication with one or more ports located near BDC in each cylinder, and through them linking the interior of the cylinder with the intake and/or exhaust systems, can produce a very important modification of the Carnot cycle by reducing, inter alia, intake and exhaust losses. Several benefits, outlined below, are obtained as a consequence:

a) during the exhaust stroke, the piston encounters reduced counter pressure compared with conventional engines;

b) similarly, during the induction stroke, the piston encounters less resistance to movement;

c) better scavenging of exhaust gases eliminates excessively hot points in the combustion chamber and in parts subject to high loads such as the piston crown, valves, cylinder head, exhaust ducts, all consequently working at a lesser temperature;

d) as a consequence of the effect described in point c), it is possible to increase the compression ratio, which contributes to increased performance;

e) further, as a consequence of the effects described in points a) and b), the loads on diverse mechanical parts such as the crankshaft bearing and the connecting rods are reduced;

f) The additional gas exhaust (near BDC) enables the conventional exhaust valve diameter to be reduced by up to approximately 25%, which allows the neighboring intake valve and ducts to be enlarged, thereby making cylinder charging more efficient;

g) The significant quantity of energy expelled through the lower exhaust (instead of what is, commonly, dissipated through the cooling system) can be largely recovered by driving a turbine, without subjecting the piston to a significant counter pressure. The turbine can be used to aid induction or to move several different parts, for instance the water pump, cooling fan, etc.

h) The engine works more efficiently at all speeds, and the response to acceleration is faster with less fuel consumption, due to the improved exhaust gas scavenging. This maximizes performance and fuel economy in urban use, without the need for forced induction.

i) engine weight can be reduced by between 20 and 25%. This allows important improvements in the following ratios:

A) a decrease in the ratio between consumed fuel and energy delivered in relation to engine weight; and B) an increase in the ratio between effective power and engine weight.

j) the engine speed can be considerably increased, even in converted conventional models. This speed increase allows specially designed engines, both with long and medium strokes, to deliver better torque and to assure more complete combustion inside the cylinder;

k) this invention can be applied to all sizes and types of machinery, and can be applied to engines using various liquid fuels, such as gasoline and alcohol, and various gaseous fuels, such as compressed natural gas or liquefied petroleum gas. The invention can also be applied to converted conventional engines, as well as to develop completely new internal combustion four stroke engines;

l) The effective life of lubricating oil is increased since it lubricates cooler parts.

m) The temperature reduction in critical points of the engine (see points (c) and (f)) allows cooling systems to be made lighter and more economical.

n) The range of land transport vehicles, water craft and aircraft using the invention is increased.

o) As a consequence of all of these points, engine performance is enhanced. With certain designs, this can provide more effective power at the crankshaft without increasing fuel consumption. Conversely, for a given power output there is a very important fuel saving;

p) The vehicle's cruising speed range is greater and the normal idle speed of 600 RPM can be reduced to about 280 RPM. This allows an improvement in the engine's performance at low and medium speeds and thus increases urban performance;

q) the compression stroke can be initiated nearer BDC at any rotation speed; and r) emissions of pollutants and so-called greenhouse gases are reduced because combustion is more complete and less fuel is required.

There are several alternative arrangements to put the invention into practice. In some arrangements, according to the type of valves used, it is necessary to structurally modify the design of certain basic parts of these engines, such as the cylinders, pistons, cylinder head, valves, gas ducts, camshafts, and cooling systems, as well as to modify the valve timing. In other arrangements, modifications are minimal.

As is well known, the power of a four stroke engine depends on the mean effective pressure in its cylinders, its stroke, its capacity, its RPM, its compression and its overall design.

With this invention, the effective power is increased by adding a supplementary valve system to a port located near BDC. Several other modifications may be required to complete the new system.

The figures presented in the following chart give an approximate quantitative idea of the invention's effect on an engine's thermal efficiency.

| CARNOT CYCLE | Approximate Performance (%) of a four stroke engine | |
|---|---|---|
| | OTTO | DIESEL |
| THEORETICAL | 77 | 82 |
| PRACTICAL | 28 | 33 |

|   | Approximate Performance (%) of a four stroke engine | |
| --- | --- | --- |
| AS MODIFIED | 42 | 46 |
| AS MODIFIED (WITH TURBINE) | 48 | 50 |

Two principal fields of application can be pointed out:
a) Transportation; and
b) Power In both fields it is possible to manufacture engines in accordance with the invention or else to convert existing engines to improve their power, torque, speed, range, etc.

(a) Transportation: The invention can be applied to engines used for mass and personal transportation such as trains, trucks, buses, vessels, cars, light aircraft, etc.

(b) Power: The invention can be applied to engines used in electricity generation, compressors, water pumps, mills, cranes, etc.

Accordingly, the present invention relates to a four-stroke internal combustion engine comprising one or more cylinders each with a piston movable therein to define a combustion chamber; inlet valve means associated with each cylinder for controlling the ingress of air or fuel-air mixture to the combustion chamber during each cycle; an exhaust valve means associated with each cylinder for controlling the egress of exhaust gases from the combustion chamber during each cycle; wherein a port is provided in a wall of each cylinder, the port being openable independently of the inlet valve means and the exhaust valve means to provide an additional route for the ingress of air or fuel/air mixture, and/or to provide an additional route for the egress of exhaust gases, to or from the combustion chamber during each cycle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 shows the principal constructional details of the invention, in particular showing a port (d) (there could be more than one) in the cylinder wall near BDC and an adjacent unit (e) that holds complementary opening/closing valves for exhaust and/or intake. The valve unit (e) can take several different forms;

FIGS. 9 and 10 show improvements in the cylinder head, in particular the enlargement of the inlet valve (a) and the inlet duct (h) diameter allowed by reducing the diameter of the exhaust valve (b) and the exhaust duct (d);

FIGS. 11A, 11B and 11C shows different systems for synchronizing the crankshaft with the valves;

FIG. 26 is a perspective view of a rotary valve body attached to the cylinder;

FIG. 27 shows a rotary valve member for the rotary valve of FIG. 26;

FIG. 28 shows the rotary valve member of FIG. 27 in more detail;

FIG. 29 shows an automatic variable distribution control mechanism for the rotary valve of FIG. 26;

DESCRIPTION OF THE PREFERRED EMBODIMENTS

Figure 2:
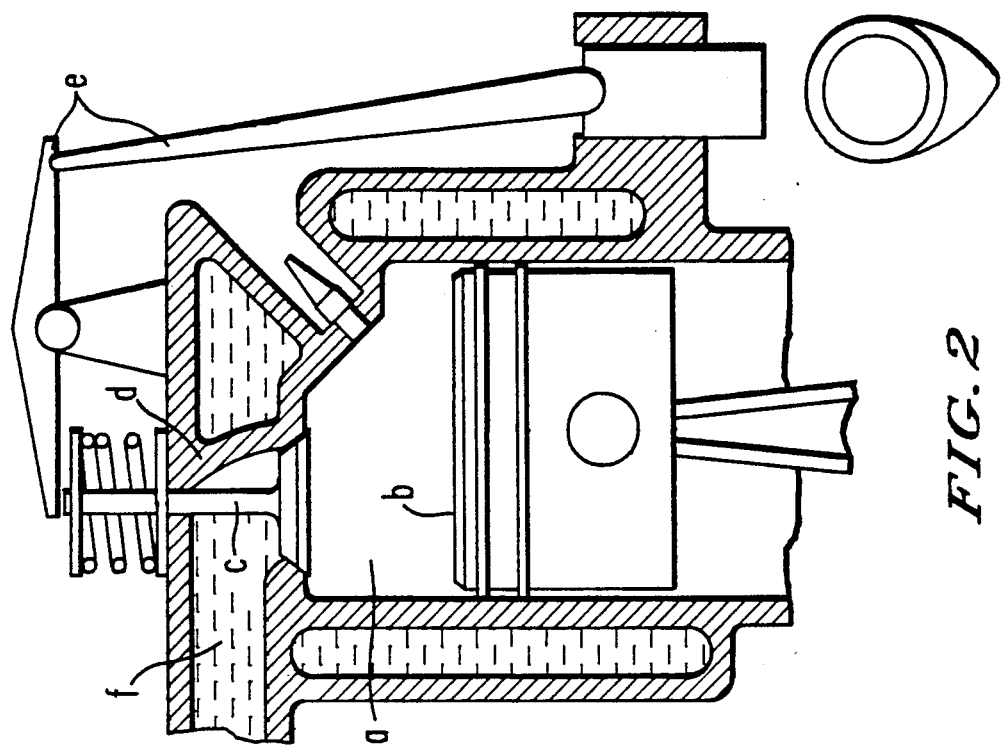
FIGS. 1, 2, 3 and 4 show the evolution of the cylinder head.
Figure 1:
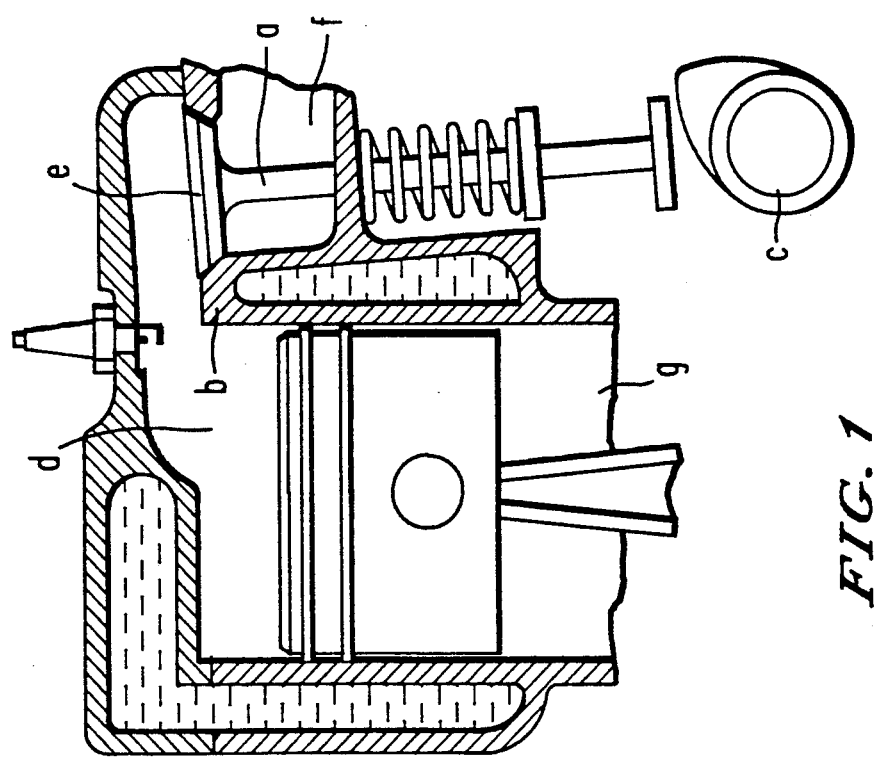
Figure 3:
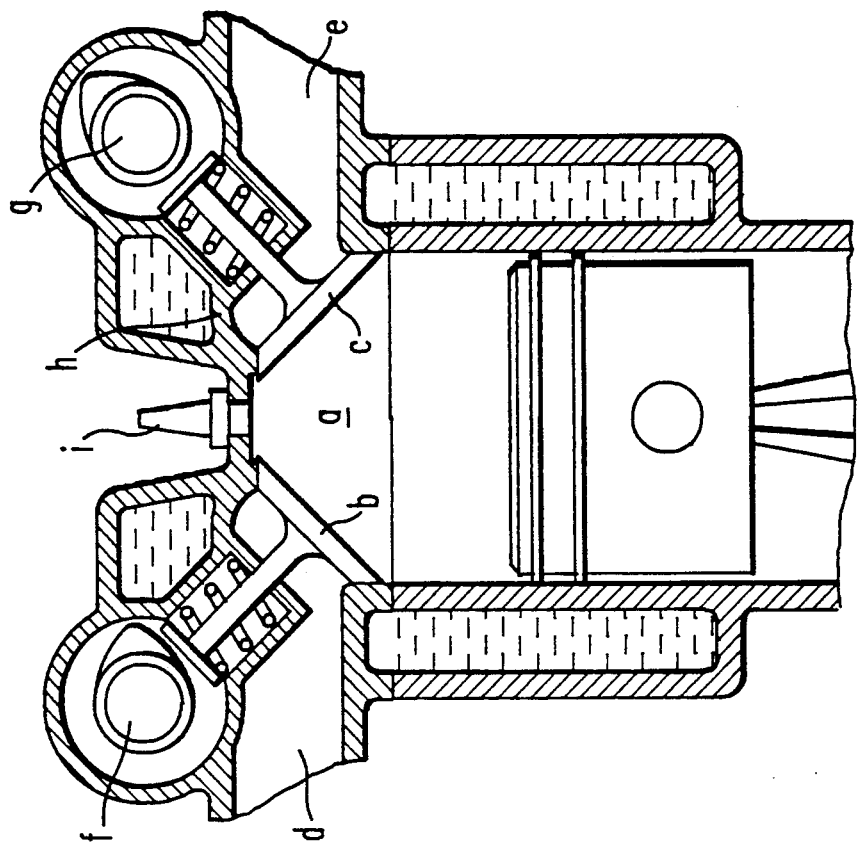
Figure 4:
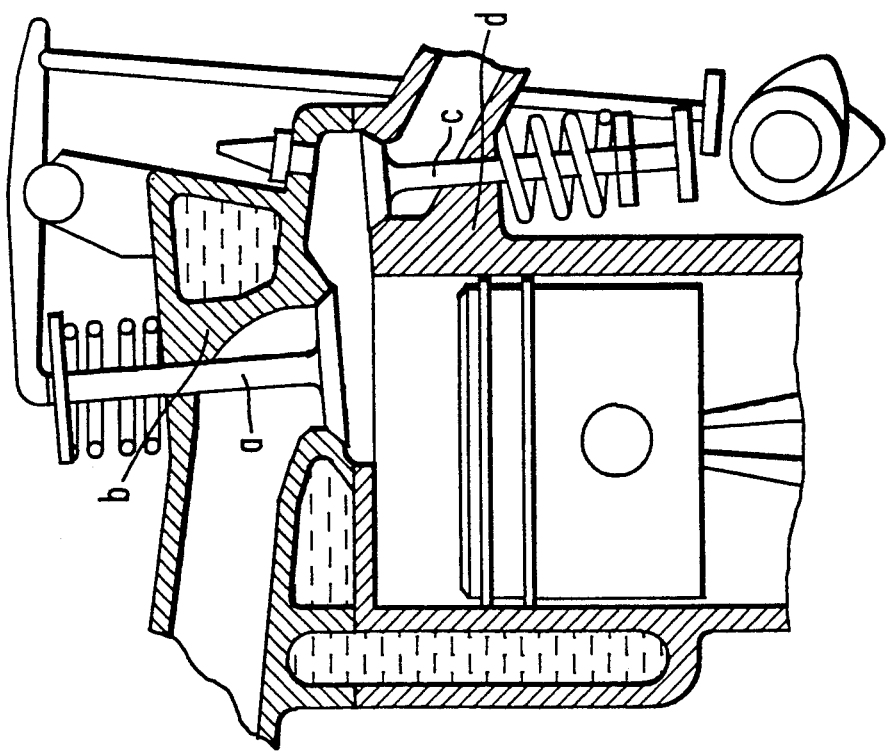
Figure 5A:
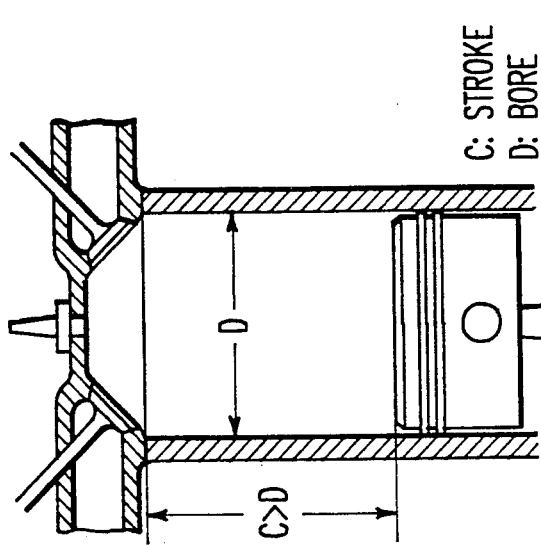
FIGS. 5A, 5B, 6A, 6B, 7A and 7B show the evolution of the piston stroke length and typical valve timing diagrams for each case.
Figure 6A:
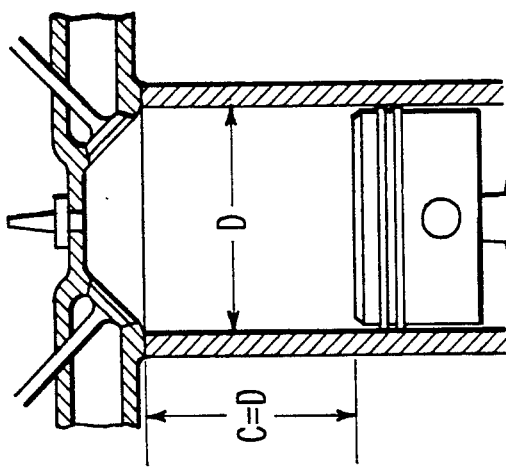
Figure 7A:
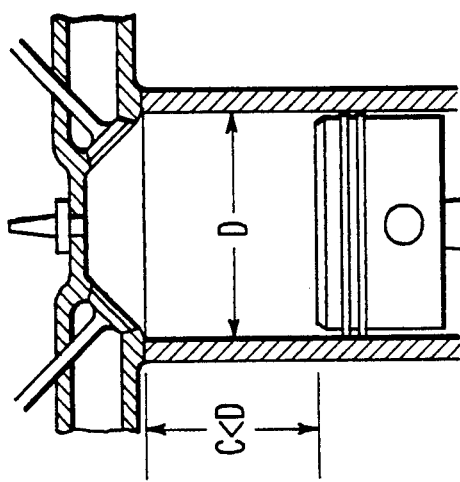
Figure 5B:
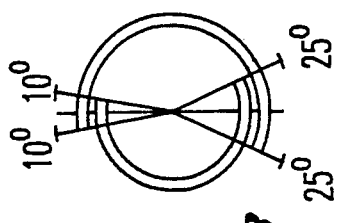
Figure 6B:
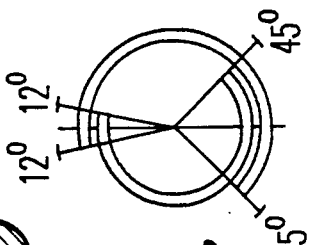
Figure 7B:
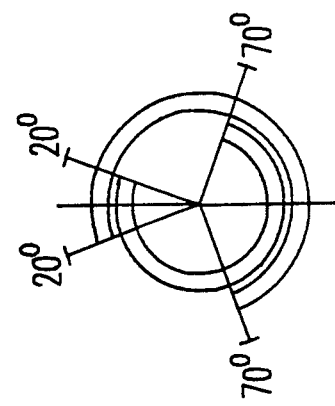

Reference has already been made to FIGS. 1 to 7 of the drawings.

Referring now to FIG. 8, a cylinder (a) contains a piston (b). The piston (b) has two upper rings (c) in sliding contact with the cylinder wall (a). Near Bottom Dead Center (BDC) is a port (d) situated in the cylinder wall. This port gives a substantial improvement in engine performance by scavenging exhaust gases, thereby freeing the piston from much of the counter pressure normally encountered during the exhaust stroke optionally, the same port (d) (or others) can be used to admit during the intake stroke an air mass or an air/fuel mixture to allow more complete charging of the cylinder.

The port (d) communicates with a valve unit (e) containing additional valves that control exhaust (f) and/or intake (g). The valves direct the intake and exhaust gases under the control of a control system (h), which may or may not be synchronized with the engine's rotation. Also, the piston (b) must be longer than usual ((L) represents the new length) in order to cover the port (d) and to support an additional ring (j) that remains under the port (d) when the piston is at top dead center (TDC). The port (d) is therefore sealed from the oil sump and lubrication system.

Stops (k) in grooves supporting the two upper rings (c) prevent them from turning about the piston (b) so that their ends cannot enter the port (d).

Referring now to FIGS. 9 and 10, in standard engines the size of valves (a) and (b) is restricted by the diameter C of the cylinder (see FIG. 10). The amount of air/fuel mixture that is able to enter the cylinder is largely dependent upon the size of inlet valve (a). Thus, when the inlet valve diameter is small, charging is poor. If a bigger intake charge is wanted, the inlet valve diameter should be increased, but this leads to a corresponding reduction in the exhaust valve (b) diameter which impairs outflow of exhaust gases. These conditions make necessary an optimal relationship between the sizes of both valves. In general, the exhaust valve area must be approximately 65% of the inlet valve area. In this way, both valve sizes are determined and consequently so is the engine's power.

By using the port (d) to reduce the volume of the exhaust gases that must be scavenged through the exhaust valve (b) and the exhaust duct, the diameter of the exhaust valve and duct can be reduced without affecting the engine's functioning. This reduction allows the diameter of the inlet valve and duct to be increased in order to improve charging. As a further consequence, this also reduces the resistance to movement encountered by the piston as it moves towards BDC during an induction stroke.

In relation with this point, it should be noted that, during the intake stroke, two phenomena known as the 'inertial effect' and the 'wave effect' occur. These phenomena promote performance in the following way:

(i) Inertial effect: The mixture acquires kinetic energy in the intake duct at the beginning of the induction stroke, and this becomes pressure as the induction stroke progresses, thereby enhancing cylinder loading.

(ii) Wave effect: This is the disturbance of the mixture intake pressure caused by its rebound from the valve to the outside through the intake duct, and that conversely returns as a compression wave which rebounds again in the atmosphere, improving mixture homogeneity and cylinder charging.

Considering these two effects, the inertial effect phenomenon always occurs, irrespective of duct size. Thus, the importance of any modification of the cylinder head's valves and ducts can be clearly seen.

Referring now to FIGS. 8 and 9, firstly consider port (d) of FIG. 8. As most exhaust gases exit through it (port (d) being the principal outlet path), the other parts shown in FIG. 9, i.e., the cylinder head (e), combustion chamber (f), piston crown (g), valves (a) and (b) and the injection and ignition parts are no longer subject to the high temperatures found in standard engines. This allows coolant volume to be halved, if the improved engine is arranged to provide the same power as a standard engine. The heat no longer dissipated via the coolant system goes out with the exhaust gases. Thus, the engine performance can be increased even more by recovering some of the exhaust gas energy that goes out through the port (d) by means of a turbine. Thus, the size, weight and cost of the cooling system (j), and also of the engine, can be reduced.

Figure 12:
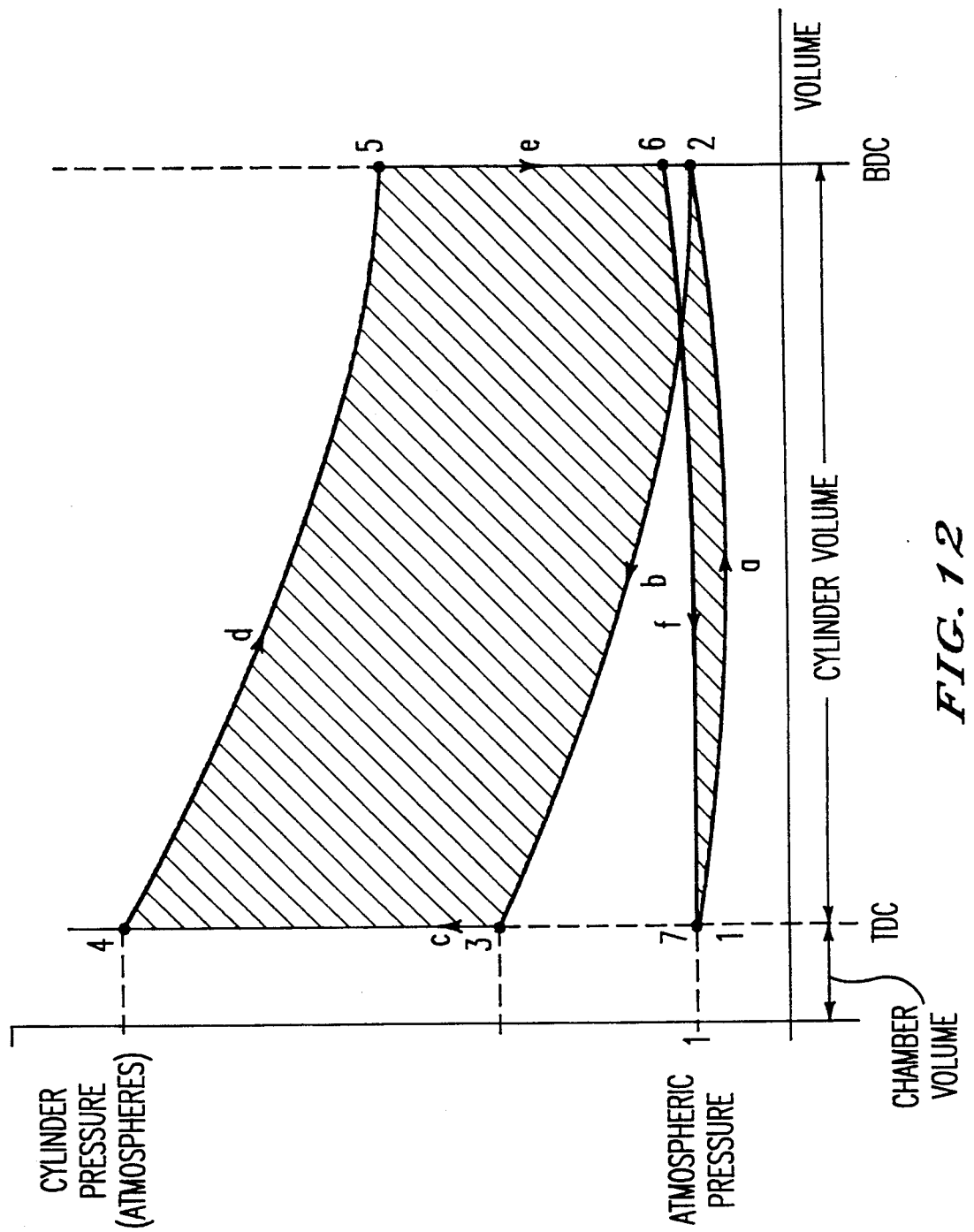
FIG. 12 shows the theoretical Carnot cycle for an internal combustion four stroke conventional Otto engine N.B. several effects have been disregarded, such as the ignition advance, the duration of combustion, heat dissipation in the cylinder walls, the exhaust and intake time duration, and valve overlap.

FIG. 12 shows the theoretical Carnot cycle for a four stroke Otto engine. Notwithstanding the theoretical character of this cycle, the intake and exhaust strokes have been slightly offset to separate both strokes, for clarity. The intake (a) of fuel/air mixture begins at 1 with the piston at TDC and ends at 2 when the piston reaches BDC. Intake, theoretically, is at a constant pressure of 1 atmosphere. From 2 to 3 an adiabatic compression (b) takes place. Ignition (c) begins at 3 and ends at 4. It is an instantaneous explosion at constant volume. From 4 to 5, adiabatic expansion (d) takes place. From 5 to 6 and then to 7 the exhaust stroke takes place, first at a constant volume (e) from 5 to 6 (this should theoretically extend from 5 to 2) and from 6 to 7 at a constant pressure (f) (this should also theoretically start at 2.

Figure 13:
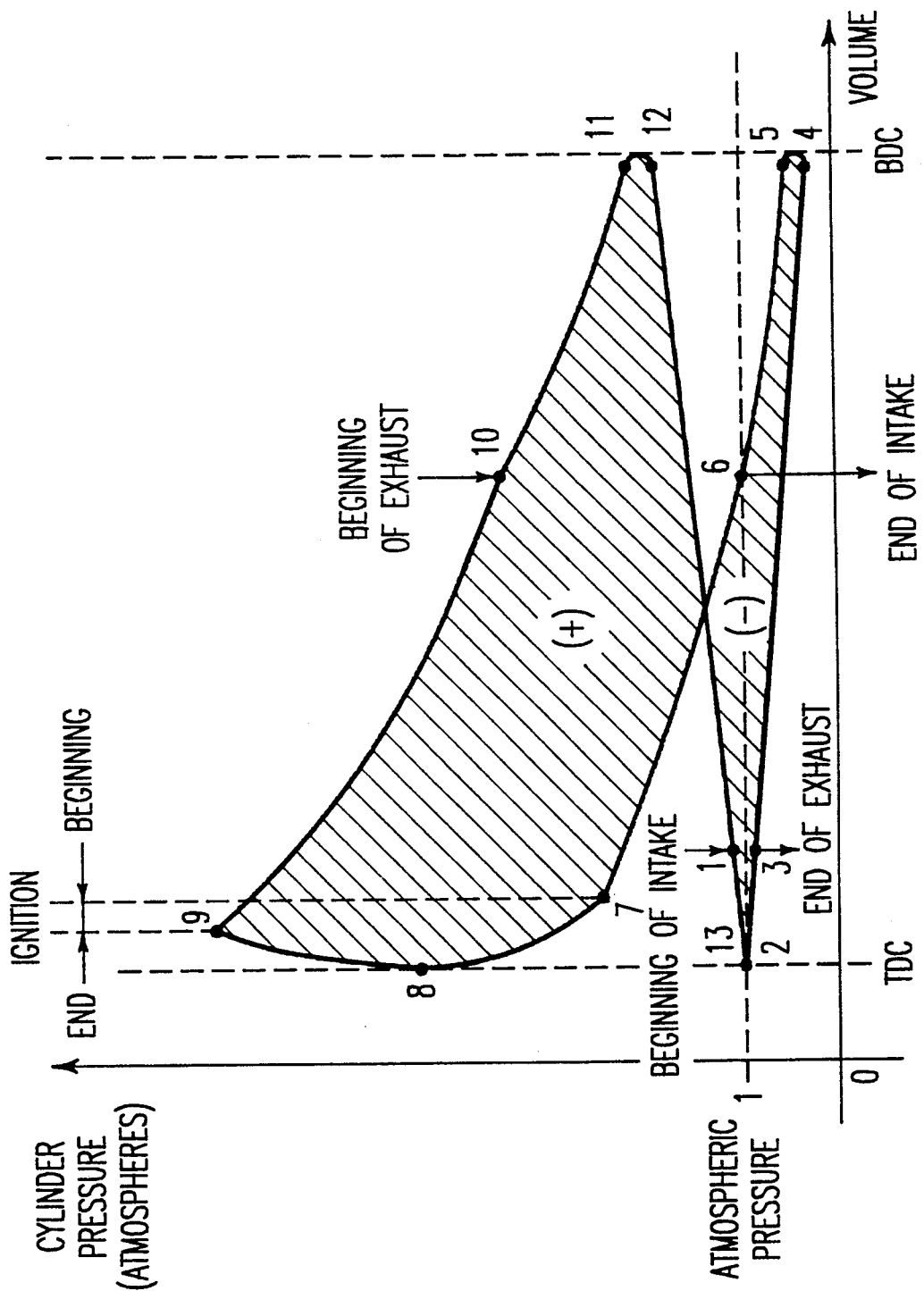
FIG. 13 shows the practical Carnot cycle for a conventional four stroke internal combustion Otto engine as currently built. In it, the ignition advance, ignition time, heat dissipation, valve overlap, intake and exhaust duration and so on have been considered. The performance loss when compared with the theoretical Carnot cycle is shown by the reduced area of the effective energy region (+) and the increased area of the cycle loss region (−)

FIG. 13 represents the practical Carnot cycle for a standard engine. In this diagram, several factors have been considered like ignition advance, the duration of the power and exhaust strokes, the intake depression, the exhaust overpressure, several heat losses, etc.

Comparing FIG. 13 with FIG. 12, it can be seen that the performance loss is represented by a decrease in the (+) area showing the effective energy per cycle and an increase in the (−) area showing energy losses per cycle. The cycle begins with:

(a) Intake stroke: The intake stroke begins at 1 and ends at 6, meaning that the intake begins during the exhaust stroke before the piston reaches TDC and ends during the compression stroke at the above-mentioned point 6. The mixture that enters from 1 to 3 facilitates scavenging of any exhaust gases from the former cycle that may remain in the combustion chamber. From 2 to 4 there is a decreasing pressure, always lower than atmospheric pressure, that tends to stop the piston. This sub-atmospheric pressure increases the effort that the engine must make to overcome it and besides limits the charging of the cylinder up to 80% of its total capacity. At BDC pressure increases abruptly from 4 to 5 because the intake of gases goes on at a constant volume in accordance with the inertial effect acquired during 2 to 4. The underpressure (subpressure) produced during the intake stroke continues to limit performance and the losses produced are called 'intake or pumping losses'.

(b) Compression stroke: The compression stroke begins at 5 and ends at 9 and has three sections, as follows:

1st—from 5 to 6 until the depression is annulled;
2nd—from 6 to 7 cold compression of an adiabatic type; and
3rd—from 7 to 9 hot compression during ignition, passing through an intermediate point 8 at TDC.

(c) Power stroke: This begins at 8 and ends at 11. From 8 to 9 it coincides with the last section of the compression stroke and ends according to an adiabatic line from 9 to 11 that is modified at 10 because the exhaust valve opens.

(d) Exhaust stroke: This has four sections. It begins at 10 when the exhaust valve opens and ends at 3. The sections are:

1st—from 10 to 11 coincides with the last section of the power stroke;

2nd—from 11 to 12 exhaust takes place at BDC practically at a constant volume. The expulsion in this section is slow and therefore the amount of gases being ejected is small because it is limited by duct size. This produces an important reduction in the effective power area. These losses are called 'timing or exhaust losses' and can be partly reduced by adjusting valve timing.

3rd—from 12 to 13 the pressure fall is approximately linear and in its last section intake begins, as already explained. During this section pressure is higher than atmospheric pressure, which hinders the total discharge of exhaust gases, even with the exhaust valve open.

4th—from 1 to 3 this section coexists with the first section of the intake stroke to complete valve overlap, meaning that both valves are simultaneously open during this part of the cycle.

In summary, the important loss in performance due to the reduction in effective work area caused by the increased intake and exhaust losses can be seen. This is mainly due to the limits on valve size imposed by the cylinder's diameter.

Figure 14:
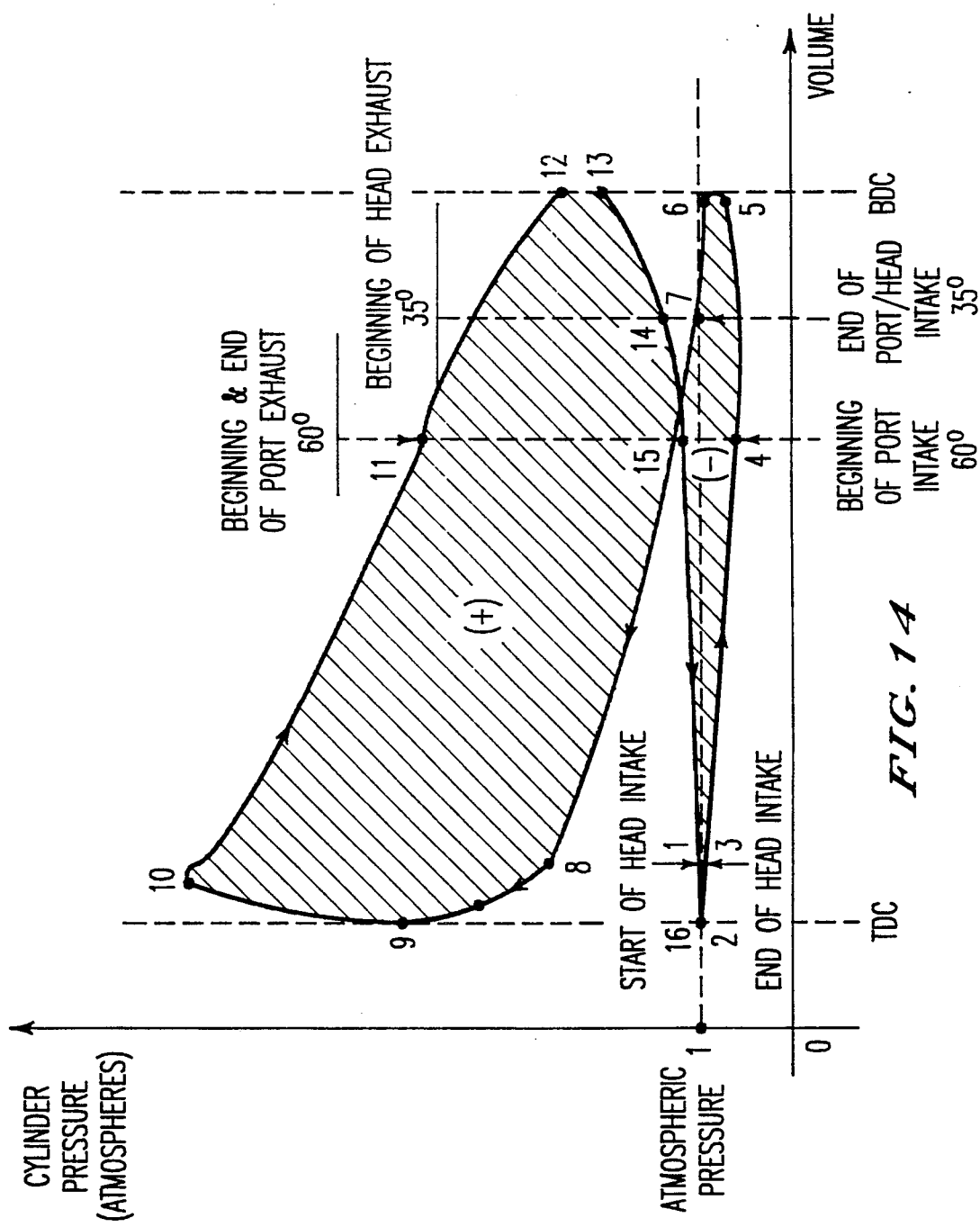
FIG. 14 shows the approximate Carnot cycle of a four stroke internal combustion Otto engine constructed in accordance with the invention. An important increase in the positive area and a decrease in the negative area, as compared with FIG. 13, and its remarkable resemblance to the theoretical Carnot cycle, are evident.

FIG. 14 shows an approximate practical Carnot cycle for a four stroke Otto engine modified in accordance with the invention. The Carnot cycle is presented as modified compared with FIG. 13, by incorporating new exhaust and/or intake valves that act near BDC. The relative increase of the area indicating effective work per cycle can be seen, as can a corresponding decrease in losses.

The cycle begins with:

(a) Intake stroke: The intake stroke begins at 1 and ends at 7, which means that intake via the cylinder head inlet duct starts before the piston arrives at TDC and ends via both the cylinder head inlet duct and the port (d) during the compression stroke at the above-mentioned point 7. The mixture that enters from 1 to 3 by the head inlet duct facilitates the scavenging of exhaust gases from the combustion chamber, exactly in the same way as in the standard engine. From 3 to 4 pressure decreases, with the aforementioned effects.

At point 4 intake begins through the port (d), improving cylinder charging. Experiments to date indicate that the volume of fuel/air mixture provided by the modified intake system is between 20 and 25% of the cylinder's volume and increases charging from 80% to 95% or 96%. Besides this the additional mixture intake helps to decrease the depression produced during the intake stroke. Between points 4 and 5 depression is reduced by the supplementary intake effect which helps to reduce resistance to piston movement.

From 5 to 7 via 6, depression decreases sharply by virtue of the inertial effect.

(b) Compression stroke: The compression stroke begins at 6 and ends at 10 and has the following three sections:

1st—from 6 to 7 with intake by both the cylinder head inlet duct and the port (d) until depression is annulled, with an important contribution from the inertial effect.

2nd from 7 to 8, cold adiabatic compression;

3rd from 8 to 10, hot compression during ignition, passing through an intermediate point 9 at TDC.

(c) Power Stroke: This starts at 9 and ends at 12. The first section from 9 to 10 coincides with the last section of the compression stroke and ends with an adiabatic expansion to point 11, at which exhaust begins through port (d). This permits fast, direct evacuation of a major part of the exhaust gases.

(d) Exhaust Stroke: This has six sections which are:

1st—The exhaust is gradually initiated at II by the port (d) during the power stroke and ends at 12 when reaching BDC, greatly decreasing pressure during that section.

2nd—From 12 to 13 exhaust takes place at BDC practically at a constant volume. In spite of the short time that the piston stays at BDC, the exhaust is very intense and so there is a steep fall in pressure which additionally helps to reduce counter pressure in the following sections and also lowers point 13 of the exhaust curve. This effect increases the positive (effective work) area and reduces the negative (losses) area of the Carnot cycle.

3rd—From 13 to 14 the rate of pressure fall tends to decrease, but at 14 exhaust begins via the cylinder head exhaust duct. That is to say, the cylinder head exhaust valve opens, which partially compensates for this phenomenon to give continuous gas exit.

4th—From 14 to 15 both the cylinder head exhaust valve and the port (d) are open simultaneously.

5th—In the section from 15 to 16 the exhaust port (d) is closed but the exit of gases continues through the cylinder head exhaust duct. The pressure fall becomes approximately linear and, in the same way as in the standard engine, the intake valve opens in the final section.

6th—From 1 to 3 passing through 16 the inlet and exhaust valves of the cylinder head are open at the same time allowing renewal of the gases in the combustion chamber.

Comparing this modified Carnot cycle with that of the standard engine, there is an important increase of the effective power and a significant decrease in the intake and exhaust losses.

Figure 15:
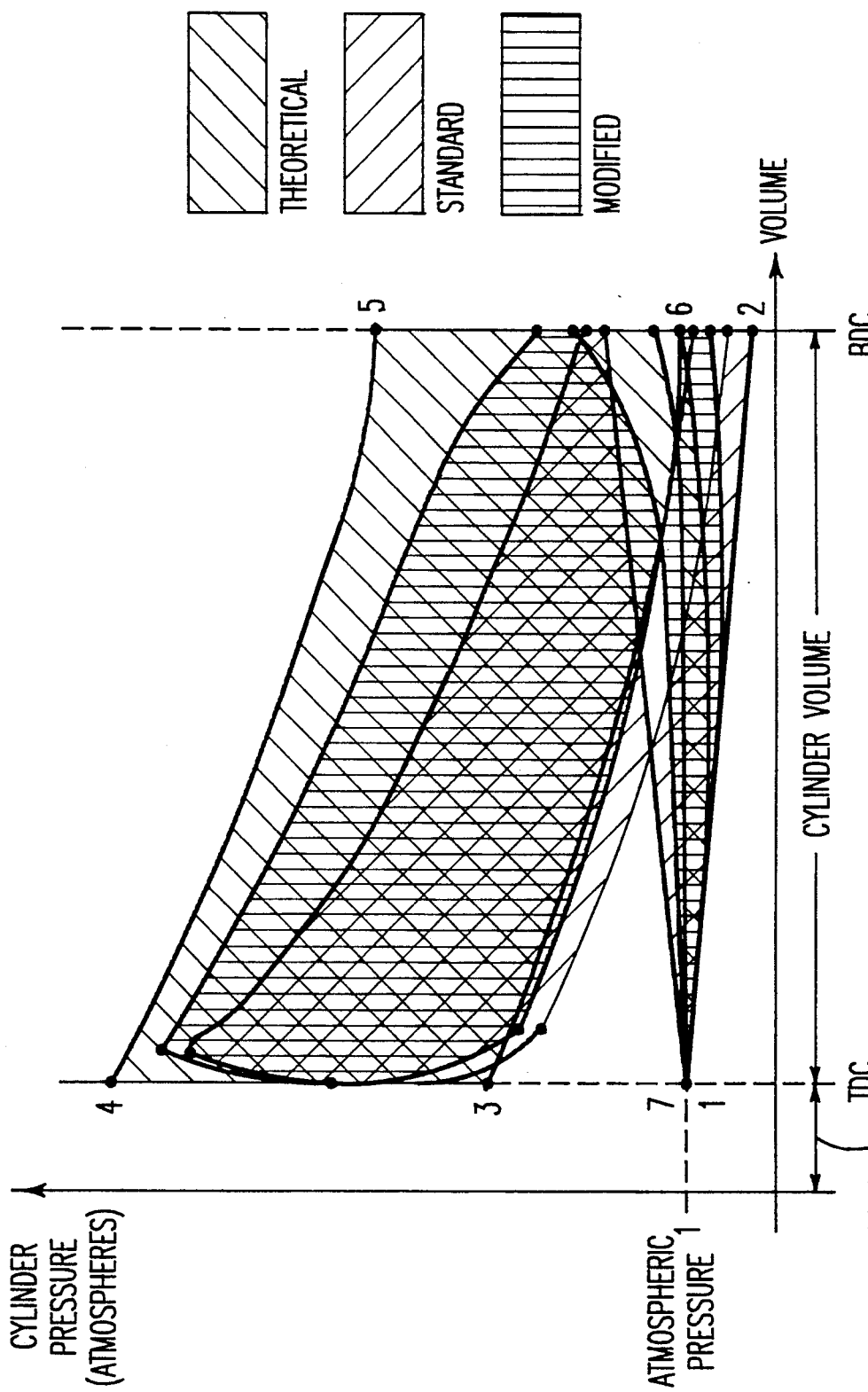
FIG. 15 superimposes the Carnot cycles of FIGS. 12, 13 and 14, so as to allow comparison of the changes in the Carnot cycle due to this invention. The diagram shows that the positive area of the modified cycle lies between the theoretical cycle and the practical cycle, giving an indication of the improvements provided by this invention. The negative area is reduced.

The superposition of FIG. 15 allows evaluation of the changes in the Carnot cycle due to the invention. It can be seen that the positive area of the modified cycle lies between the theoretical cycle and the standard practical cycle, providing an indication of the improvements obtained. Conversely, the negative area is reduced.

Figure 16:
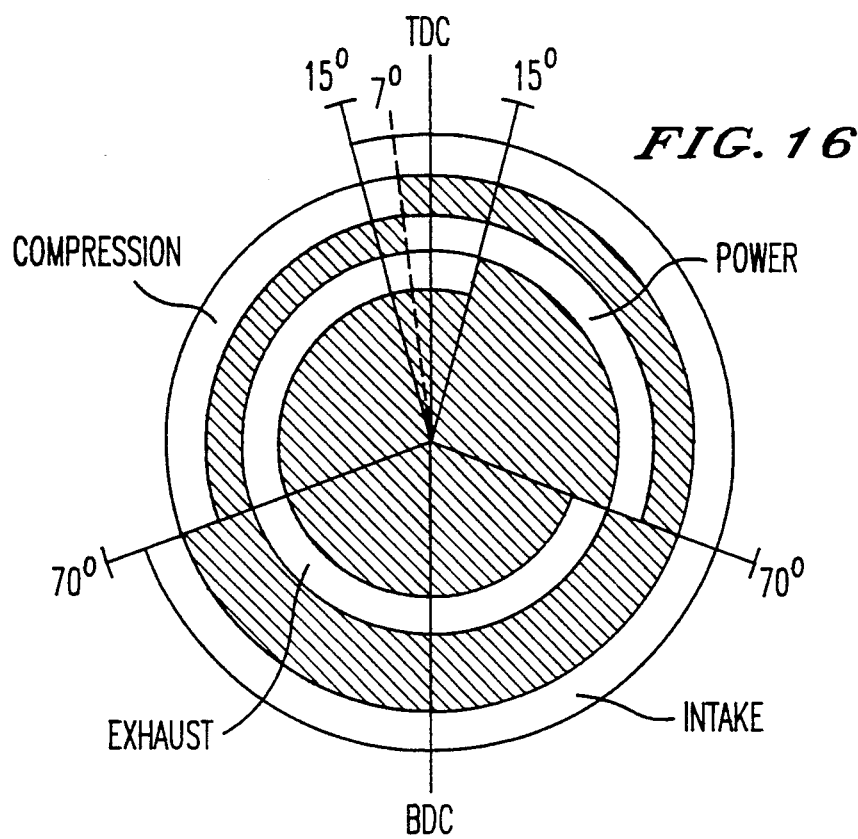
FIG. 16 shows a standard valve timing diagram.

In FIG. 16 a standard type diagram is shown for the purpose of comparison with the modified diagram in the next figure. The four strokes can be described as follows:

1st: Intake This begins 15 degrees before TDC and ends 70 degrees after BDC, staying open for 265 degrees;

2nd: Compression This lasts from 70 degrees after BDC until the ignition point near TDC;

3rd: Power This begins approximately 7 degrees in advance of TDC and develops until 70 degrees before BDC; and 4th: Exhaust This begins 70 degrees before BDC to produce a valve overlap of 30 degrees to renew the gases in the combustion chamber. The exhaust stroke lasts 265 degrees.

Figure 17:
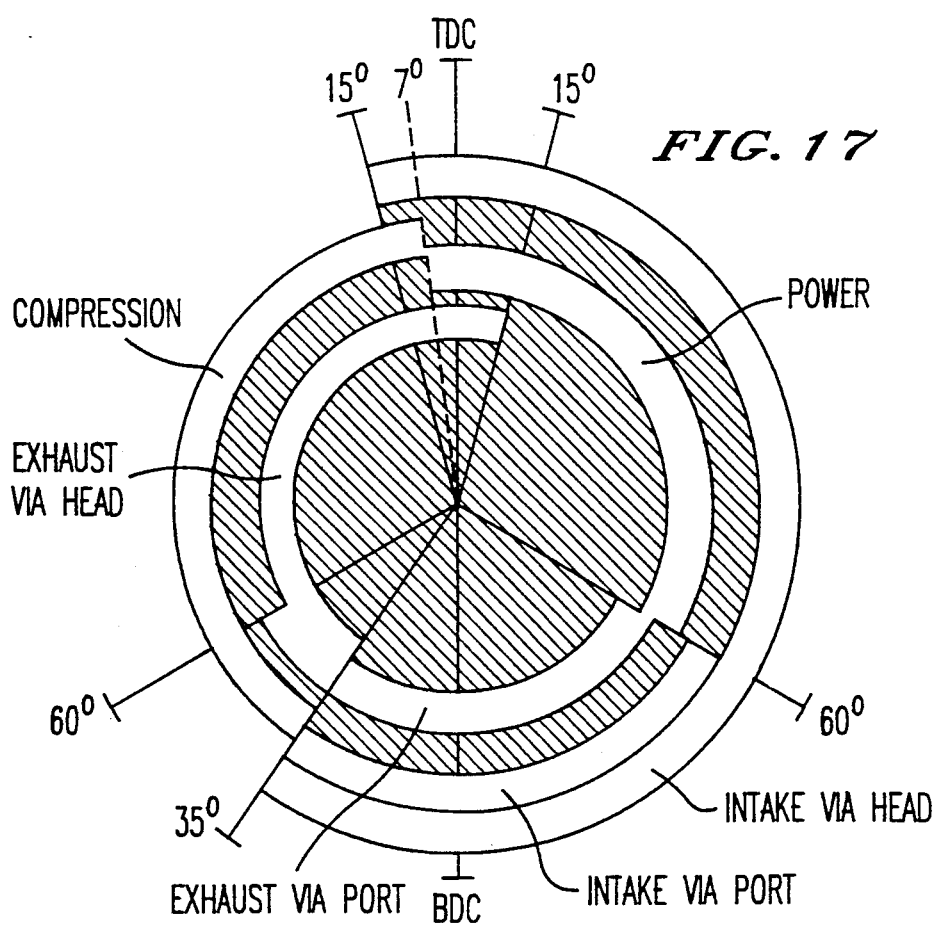
FIG. 17 shows modified valve timing diagram. Taking FIG. 16 as a reference, the fundamental differences between the standard and the modified valve timing diagrams can be appreciated.

Taking as reference FIG. 16, the fundamental differences between modified and standard engines can be compared by studying FIG. 17. The valves functioning in the modified engine will be described as well the operation of the intake and exhaust port valves. For now, the four strokes will be described:

1st: Intake This covers a total of 230 degrees distributed as follows:

a) The cycle begins by opening the cylinder head inlet valve approximately 15 degrees before TDC. In this example this valve closes 35 degrees after BDC (total opening duration 230 degrees);

b) the port (d) is uncovered by the piston and is opened 60 degrees before BDC and is closed again mechanically 35 degrees after BDC. During the opening of this port, there is a supplementary intake with a duration of 95 degrees operating at the same time as the cylinder head inlet valve. This provides improved charging of the cylinder, thereby allowing better conditions to begin compression;

2nd: Compression This begins 35 degrees after BDC and ends with ignition approximately 10 degrees (in this example 7 degrees) in advance of TDC;

3rd: Power This takes place normally, and follows the standard course; and

4th: Exhaust This stroke covers a total of 225 degrees distributed as follows:

a) Via the port (d)—This begins when the piston gradually uncovers the port (d) 60 degrees before BDC and ends 60 degrees after BDC, with a total duration of 120 degrees. This evacuation through the port (d) is very important due to the great pressure of the exhaust gases. The opening of port (d) overlaps during the last 25 degrees with the opening of the cylinder head exhaust valve, ensuring the continuity of the exhaust process and the energetic evacuation of heat; and b) Via the cylinder head exhaust valve—As explained above, exhaust by the cylinder head exhaust valve begins 35 degrees after BDC and ends between 7 and 15 degrees after TDC (15 degrees in this example). As is evident, there is a valve overlap like in a standard engine.

Figure 18:
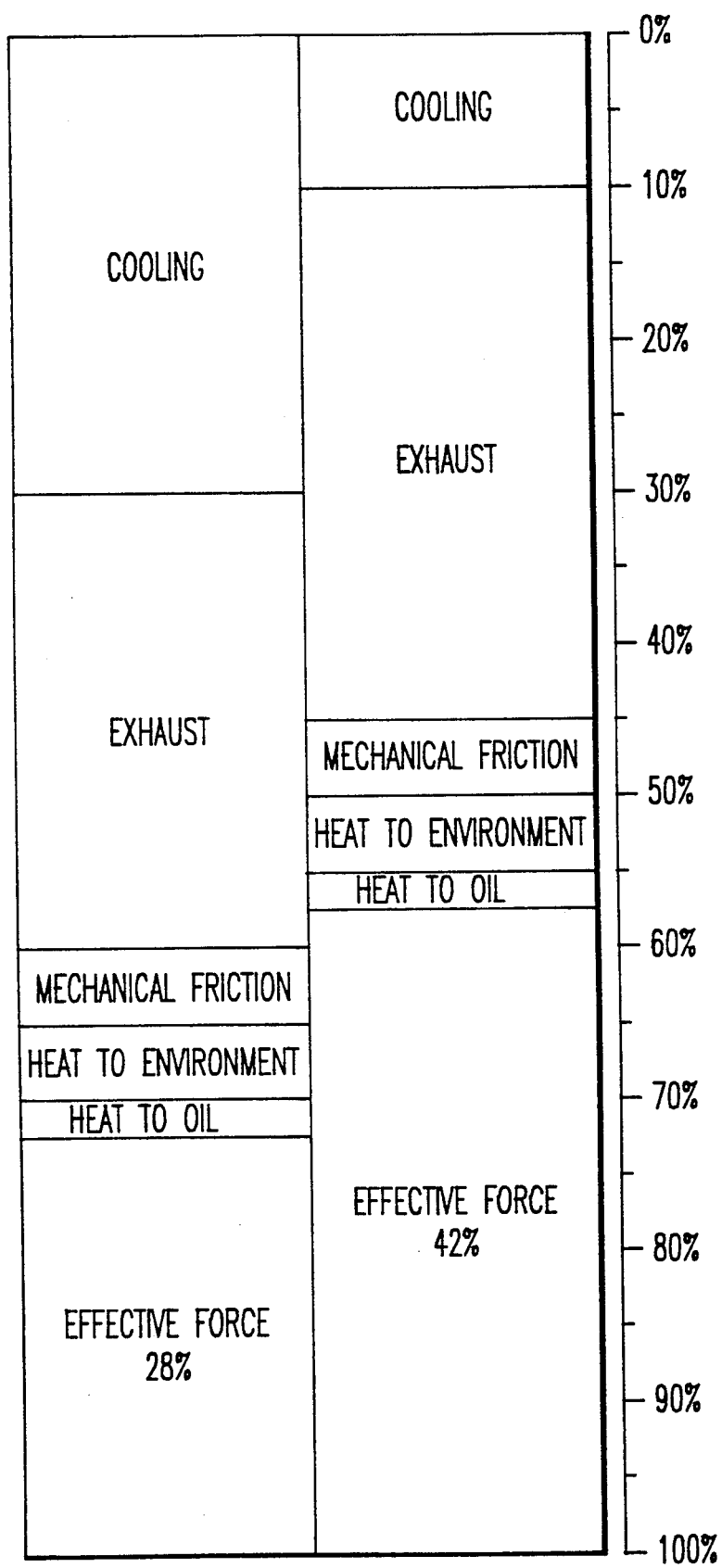
FIG. 18 illustrates the energy balances of a normal engine and a modified engine.

In FIG. 18 the energy balances of a standard engine and a modified engine are compared, in accordance with experimental results. As can be seen, the performance of the modified engine is notably better.

Figure 19:
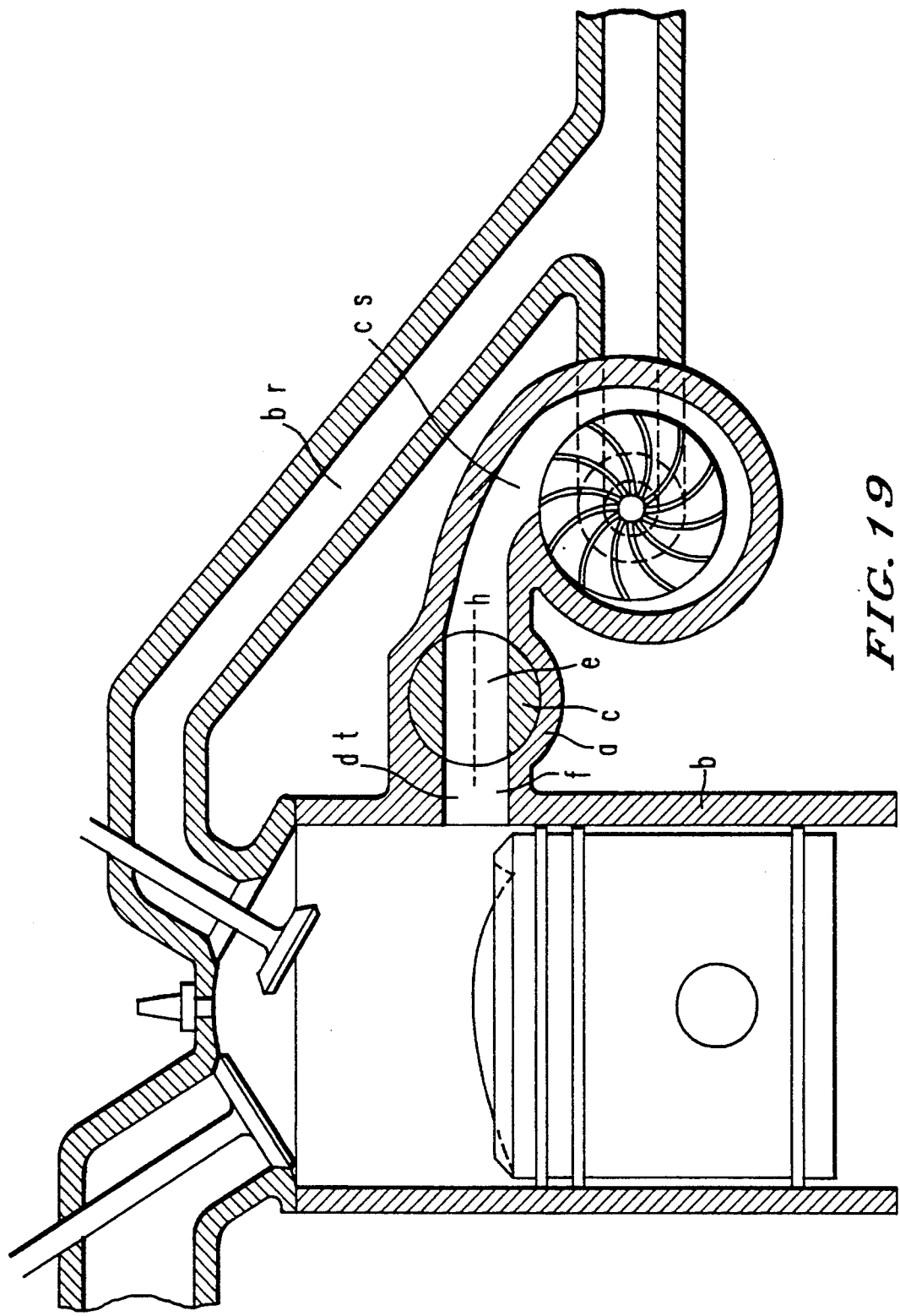
FIG. 19 shows intake and exhaust ducts of a modified engine employing an exhaust rotary valve and a turbine situated in the exhaust duct.

Referring now to FIG. 19, the scavenging of gases in the modified engine is made through ducts (r) and (s), (s) being the principal duct since it connects with the port (f) through which most of the exhaust gases exit. The cylinder head exhaust duct (r) can therefore be of smaller diameter considering that most gases escape through the port (f). When the engine accelerates, the volume of gases in each of the ducts increases gradually and simultaneously. The mixture or air intake (depending upon whether it is, respectively, an Otto or a Diesel engine) through the cylinder head can be optimized if the inlet duct and inlet valve diameter is increased. This option exists thanks to the reduction of the cylinder head exhaust valve size.

FIGS. 20(a) to 20(h) show several possible exhaust manifold arrangements for four stroke Otto and Diesel engines. The letters in these figures have the following meanings:

A) port exhaust duct (principal duct);
B) cylinder head exhaust duct (secondary duct);
C) special muffler;
D) turbine to supercharge the engine or to operate accessories;
E) port valve;
F) valve actuating wheel synchronized with the crankshaft;
G) exhaust manifold from ports;
H) exhaust duct junction;
I) port intake valves; and
J) intake ducts.

FIGS. 20(a) to 20(d) depict Diesel cycle engines and FIGS. 20(e) to 20(h) show Otto cycle engines.

Figure 20A:
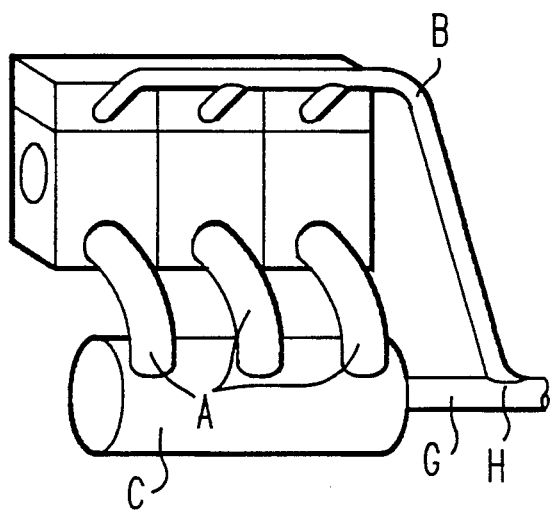
FIGS. 20(a) to 20(h) show different forms of manifold arrangement for the expulsion of exhaust gases and for using the energy of those gases.

The arrangement of FIG. 20(a) is exclusively for engines with an exhaust port. Each cylinder has an independent port exhaust duct (A). Port valves are not necessary since the length and diameter of the exhaust pipes are such that, by virtue of the inertial effect, exhaust gases cannot re-enter a cylinder nor enter another cylinder, especially during the intake stroke.

The muffler (C) is big to avoid possible saturation and is located before point (h) where the exhaust ducts join.

Figure 20B:
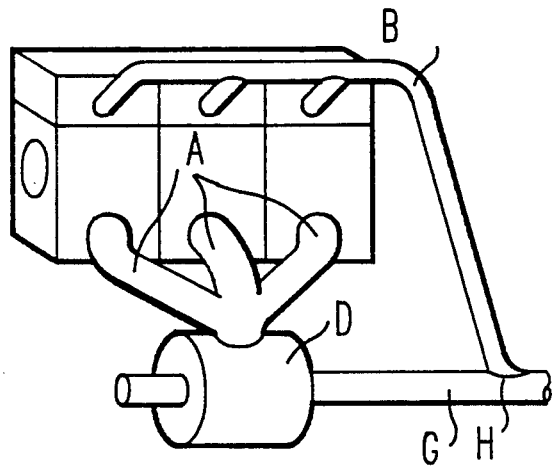

The arrangement of FIG. 20(b) is also exclusively for engines with an exhaust port.

A turbine (D) is situated the ducts (A) and point (H). The turbine (D) has a special design that besides using part of the exhaust gas energy, also serves as a port valve avoiding return of exhaust gas towards the cylinders. FIG. 20(c) embodies port valves (E) synchronized with the crankshaft rotation via the valve actuating wheel (F).

Figure 20D:
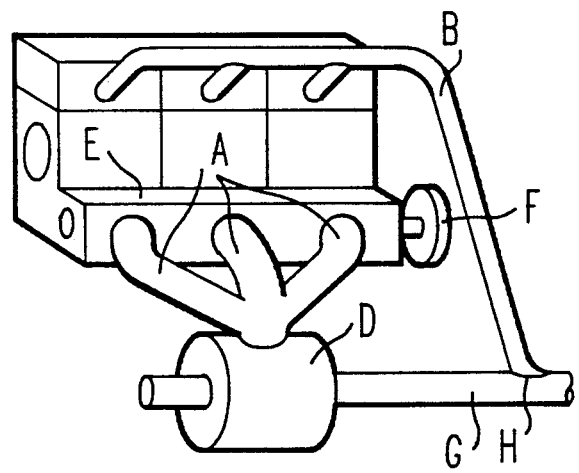
Figure 20C:
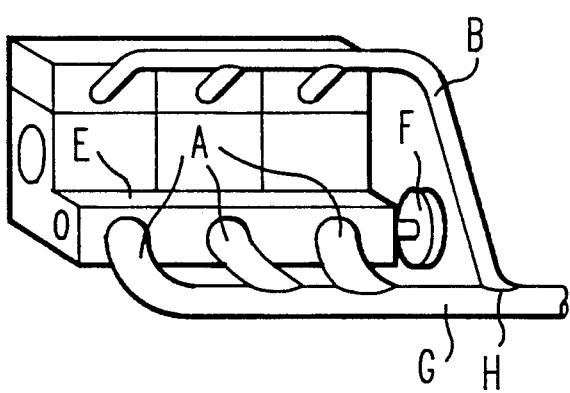

The arrangement of FIG. 20(d) is also apt for Otto engines. Exhaust gases are controlled through rotary valve means (E) in the ports.

Figure 20F:
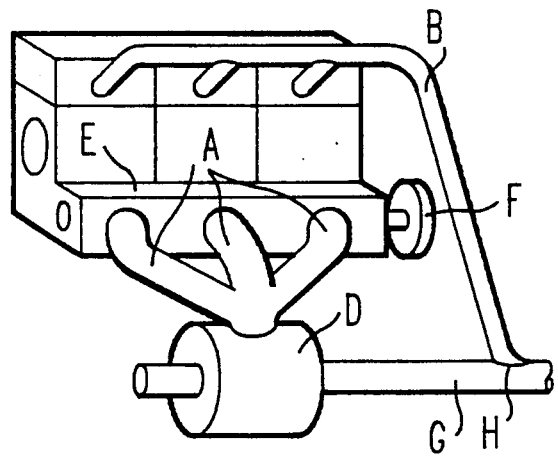
Figure 20E:
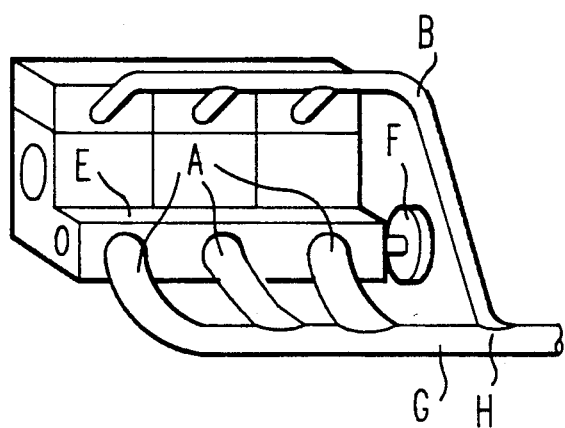

In the arrangement of FIG. 20(e), the port valves (E) can be for exhaust or double action (intake/exhaust) working in synchronization with the engines rotation, or they can be pneumatically operated by the pressure (either positive or negative) of the moving gases. If the port valves are double action they must be connected with the intake manifold to obtain fuel/air mixture.

FIG. 20(f) shows an arrangement with a single rotary valve system and a turbine.

Figure 20G:
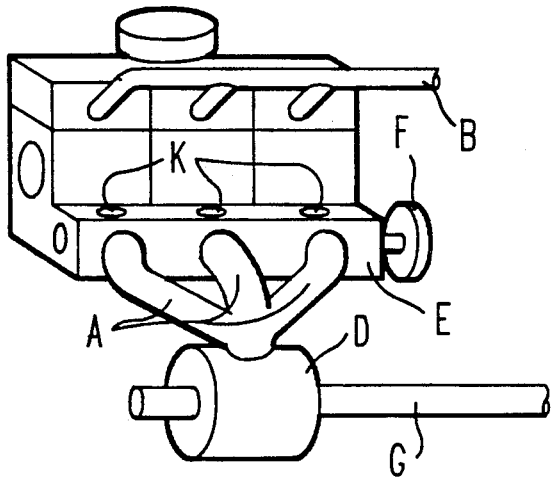

The embodiment of FIG. 20(g) has intake and exhaust ducts through ports, and a rotary valve and turbine, together with a supplementary inlet duct (K) near BDC. This design fulfills all of the purposes studied.

Figure 20H:
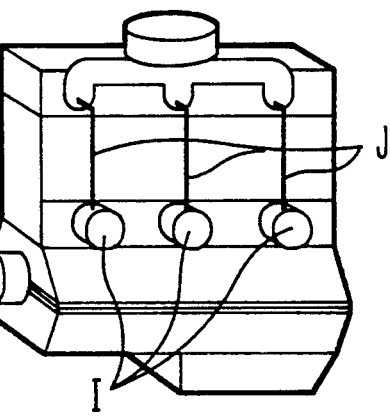

In FIG. 20(h), the engine has intake valves (I) with independent ports which can be governed by depression, by mechanical connection with the camshaft or by any other system. The intake ducts (J) can be connected to the intake manifold or to the oil sump. This arrangement can be applied to most engines.

It should be emphasized that the single or double action rotary valve used in all of these embodiments can be replaced by any of the valve types mentioned below.

The following figures show how the control of intake and exhaust gas flows can be achieved through the intake and exhaust ports that are opened when the piston moves towards BDC by means of valves specially designed for that function.

It will be recalled that the port or ports allow a greater flow of intake gases and exhaust gases. The transfer window must have optimal dimensions that should not exceed certain limits depending upon the engine type. The mechanisms to be specified are classified into two groups.

(a) Group 1: Mechanisms that are common to all types of valves; and (b) Group 2: Mechanisms that are exclusive to each type of valve.

Dealing firstly with Group 1, as explained before, the valves are used to direct the intake or exit of gases to the cylinder through the port via appropriate ducts. The associated valve system may be designed in several ways, as will be seen. For instance, the moving parts of the valves can be spherical, cylindrical or any alternative shape, and can be rotary, spring loaded, pressure controlled, synchronized with the engine crankshaft, electrically actuated, etc. In order to better control the gases, these valves must seat in the port proper or in its periphery opening or closing the port according to the needs of the cycle and the function the port has to fulfil in the cycle.

If required, any of the devices described herein can be adopted for the inlet valve.

Figure 21:
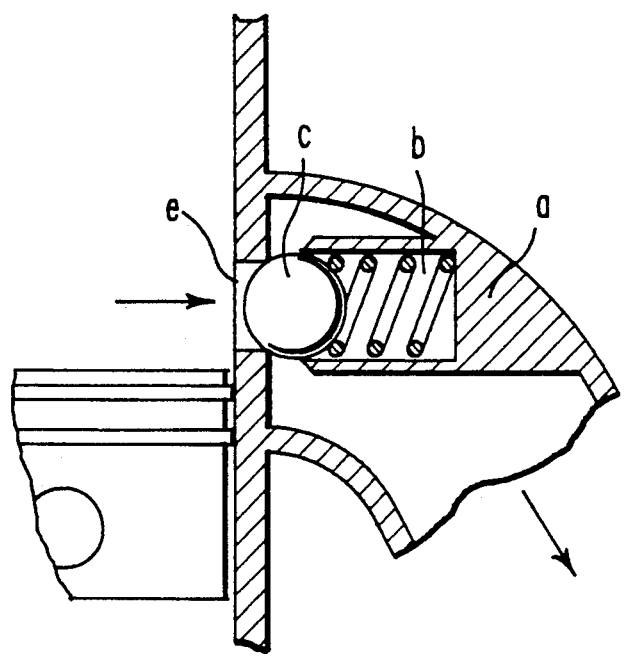
FIGS. 21 and 22 show spring and ball or disk valves that can be used to control gas flows. Their construction is elementary.
Figure 22:
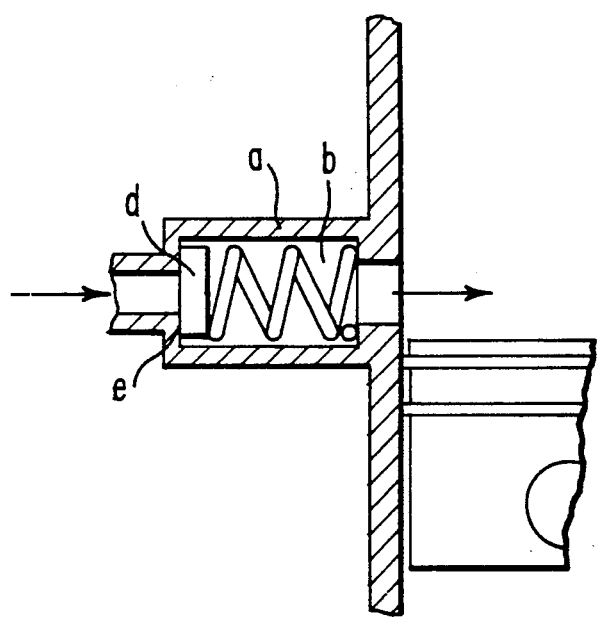

Turning now to Group 2, the valves shown in FIGS. 21 and 22 act according to the direction of gas movement and are therefore apt only to control exhaust or intake. Their construction is simple, since they have a body (a), with a cavity for a spring (b), one or more steel balls (c) or discs (d), and a seat (e).

In use, the sphere or disc is forced off its seat against the pressure of the spring, thereby opening the valve, when it is subjected to enough pressure to overcome the spring. This happens after the piston leaves the port open at the end of the power stroke and at the start of the exhaust stroke. Besides, the sphere or disc has the purpose of obstructing the gas flow coming from other cylinders or from the former cycle. These valves can be built with one or several balls or discs situated near BDC.

Figure 23:
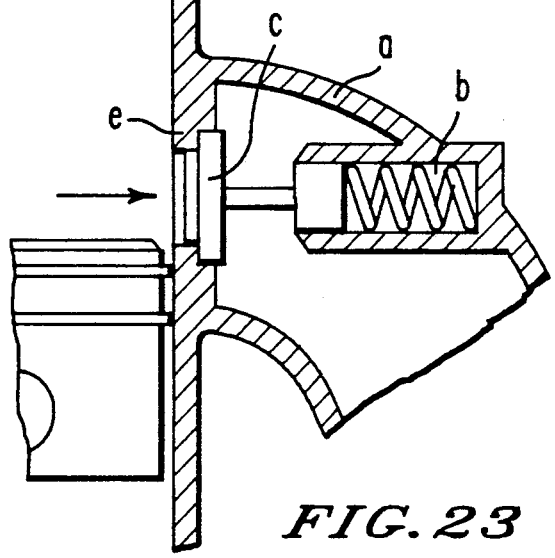
FIG. 23 shows a spring and sheet valve.

FIG. 23 shows a spring and plate valve whose mechanism and function are broadly similar to the valves described above.

Figure 24:
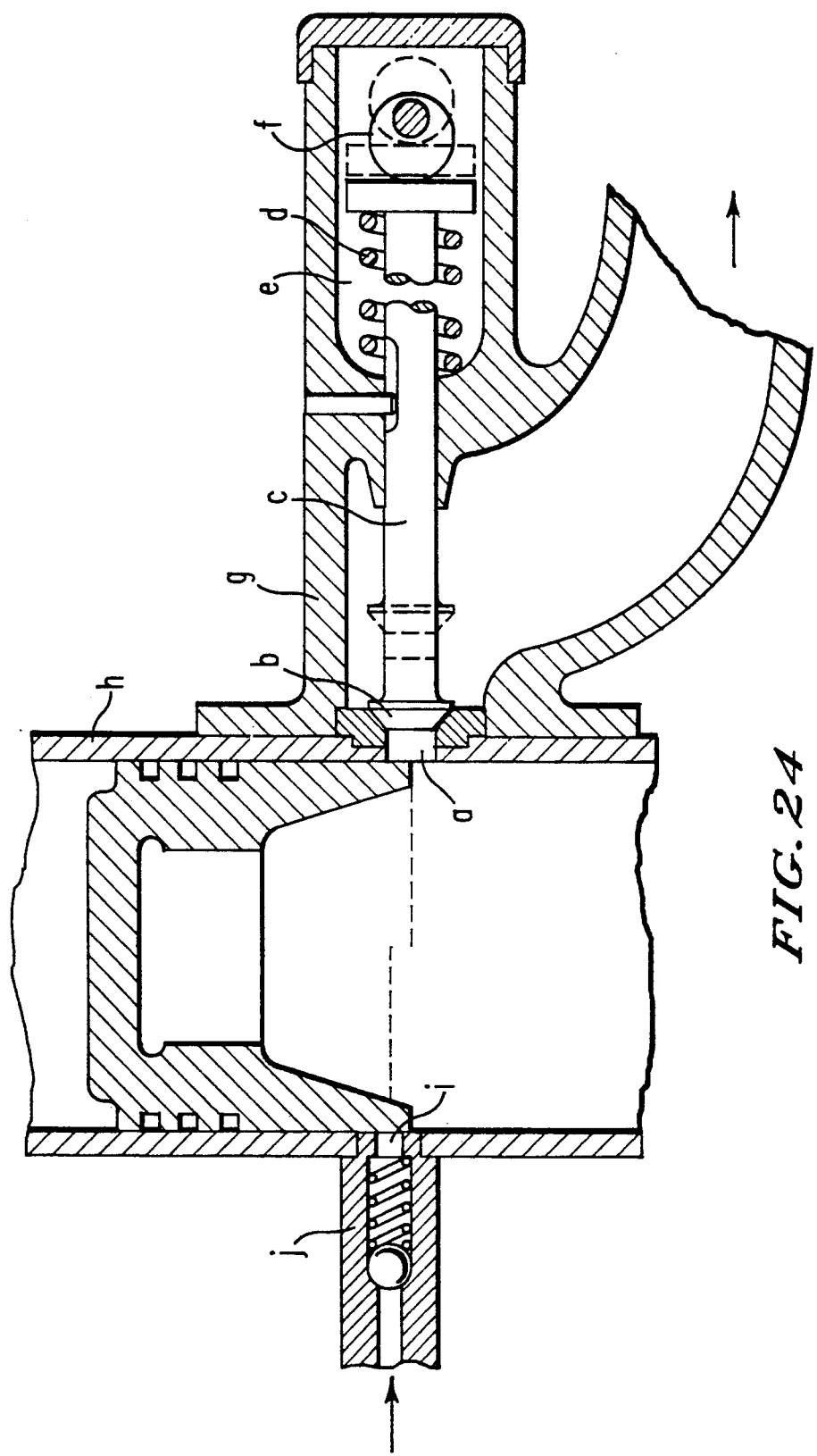
FIG. 24 shows spring or mechanical command valves in a preferred arrangement.

FIG. 24 shows an embodiment that contemplates the possibilities of the valves described above and is also suitable for engines with a piston shorter than its stroke (standard adapted engines). This system eliminates the dead space (A) that is left between the inside wall of the cylinder and the valve seat (b) by shaping the valve member to conform with the space to be occupied. This has the advantage of preventing the accumulation of oil and oil vapors in this region when the piston is towards TDC. Besides, the valve works better because there is a guiding rod (c) that controls closing and opening helped by a spring (d) housed in the chamber (e). In the chamber there might be on the other hand a cam or other mechanical actuator (f) synchronized with the engine rotation.

All of these components are housed on a body (g) that is independent from the block (h) to ease its disassembly and eventual repair. Also, several valves can be situated near BDC. The valve described only serves for exhaust purposes, but other valves (j) can be made for intake using similar principles. If the piston length is less than its stroke, the intake valve must be situated towards TDC so that the piston skirt can effectively obstruct the port (FIG. 24j). With respect to the exhaust valve and the block in which it is situated, the valves must penetrate inside the cylinder to communicate therewith.

Figure 25:
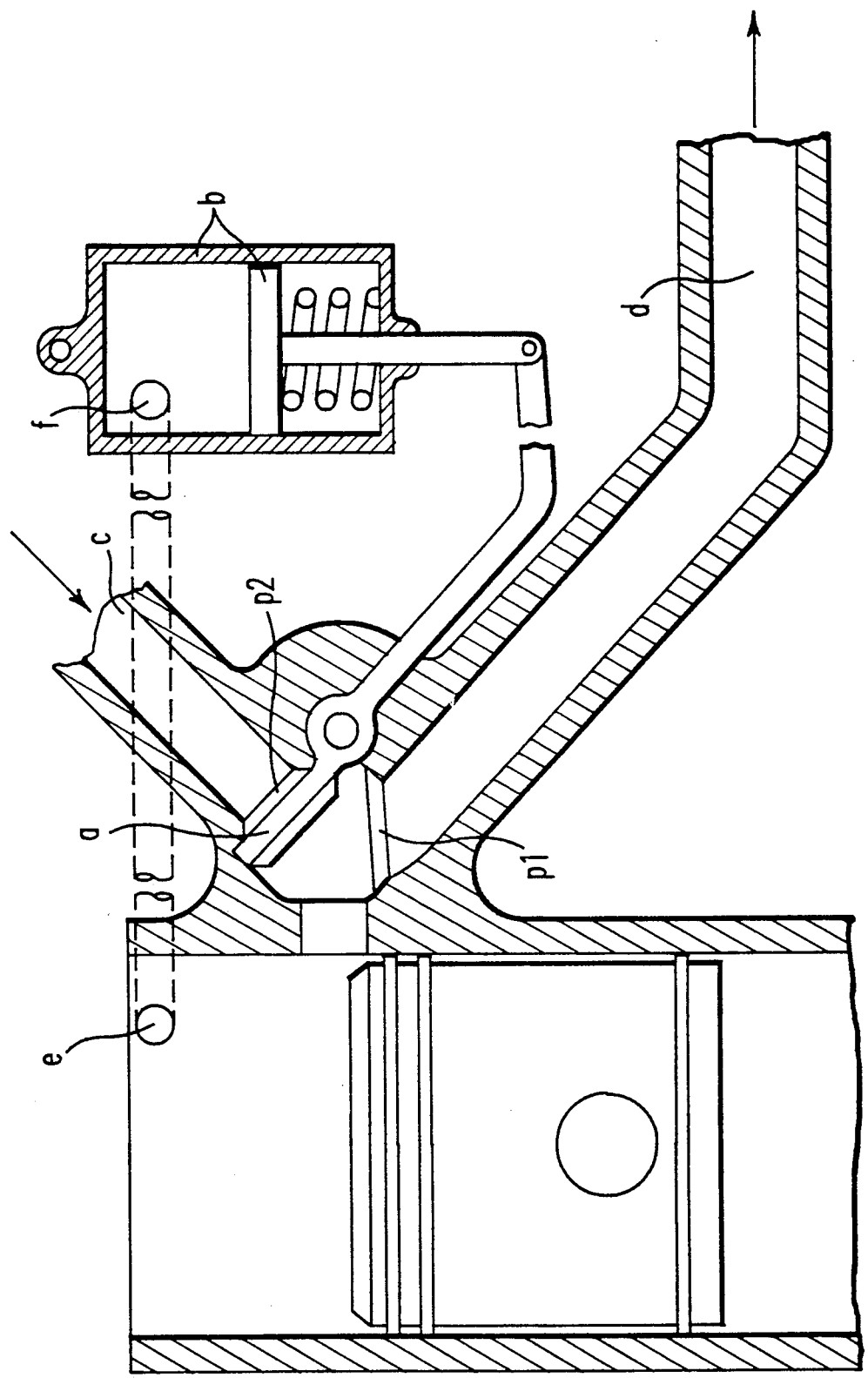
FIG. 25 shows an alternative intake and exhaust valve, in particular a double-acting valve with an alternating leaf for gas control.

FIG. 25 shows an alternative intake and exhaust valve having a double action, with a flap (a) capable of alternating movement that can be governed by pressure and/or depression, mechanical or electrical control (b) synchronized with the engine. The flap system fulfills both intake and exhaust control objectives. The flap (a) in position P1 allows intake from the duct (c). In position P2, exhaust gases are directed through duct (d). In the figure the valve is receiving pressure via a conduit between an opening (e) in the cylinder and an opening (f) in the control (b). While there is a certain level of pressure in the cylinder, the flap (a) remains in position P2. When the piston rises it closes opening (e), which permits the system (a) to return to position P1. The opening (e) in the cylinder must be placed in such a way that the working of the system is perfectly synchronized with the flap (a) positions.

Returning briefly to FIG. 19, this figure shows a new arrangement for the exhaust duct. (a) is a valve body situated adjacent the cylinder wall (b), (c) is a cylindrical valve member as described in FIGS. 26 and 27. A diametral hole (e) links the port with the exhaust duct (e) twice per rotation.

Figure 30:
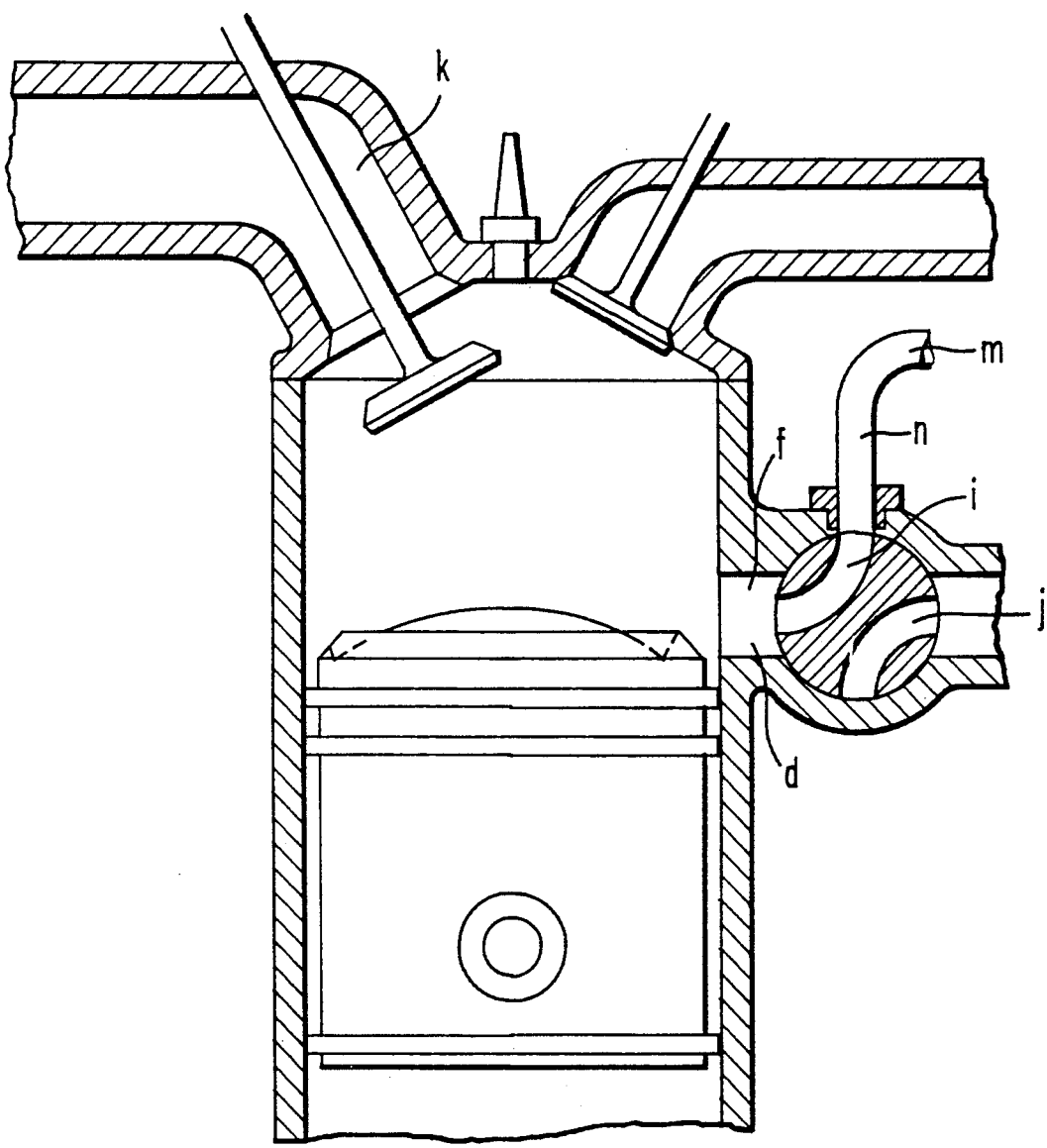
FIG. 30 shows a cylinder with a rotary valve in the intake position through (i) and (k) ducts. The (j) duct is momentarily blocked (FIG. 19 shows the rotary valve position during exhaust)

FIG. 30 shows a port rotary valve in its intake position. FIGS. 26 and 28 should be consulted for its construction. (i) and (j) are two curved ducts, independent of each other, that link the port with the intake duct (m) twice per rotation.

FIG. 26 shows the fundamental elements of the rotary valve and their position with respect to the cylinder axis (k). The letters (a), (b) and (c) have the meaning already indicated. (m) and (s) respectively represent the intake and exhaust ducts.

FIG. 27 illustrates the exhaust function of the rotary valve member (c). Each end of the valve member has spindles (d) to be received in bearings or the like. The diametral hole (e) can be clearly seen. Its periphery must coincide with the walls of the port (f), normally having a generally rectangular slot-like form.

FIG. 28 shows part of the exhaust hole (e) and one of the intake ducts (i) and (j). (w) represents a channel that connects the intake duct to its port.

At the end (c) of the valve member with the longest spindle there is a gear (9) (FIG. 29) that transmits rotary drive, synchronized with the position of the piston through the engine's crankshaft. The duct stays open in relation with the segmented line (h) (FIG. 19), to allow evacuation of the combustion gases during the exhaust stroke. Upon turning through 90 degrees, the hole (e) is perpendicular to line (h) and the port is closed to exhaust gases. In short, the valve member opens and closes the exhaust every 90 degrees and therefore it should rotate 180 degrees per complete engine cycle, since this function is accomplished in similar fashion from both sides of the hole. This requires that the rotational speed of the valve member should be half that of the camshaft and therefore a quarter that of the crankshaft. The valve member of FIG. 27 is for a rotary exhaust valve with two openings per rotation. Each engine cylinder must have a similar valve and they must all be synchronized with the firing order.

In another double-acting valve, provision is made for two exhaust actions and two intake actions per valve rotation. To achieve that, aside from the diametral slots for the exhaust, two independent curved ducts (i) and (j) as shown in FIGS. 28 and 30 are employed, devised to inject air/fuel mixture by the port. The mouths of the ducts are spaced apart by 90 degrees and so, when channel (i) is open, channel (j) is closed at one end. FIG. 30 shows that during the intake stroke, the position of the valve member (c) is such that:

(i) the diametral exhaust slot is located at 90 degrees to the port axis and therefore has both ends closed; and (ii) duct (i) receives air/fuel mixture from the intake conduit (m), which enters the valve body at (n) and goes on through ducts (i) and (f) to the cylinder when there is low pressure within the cylinder.

The mechanism illustrated in FIG. 29 is one of several possible embodiments for an automatic variable valve timing control dependent upon the rotational speed of the engine. This embodiment employs centrifugal control in which the primary movement is transmitted in a synchronized way to a gear wheel (g) and through a coupling disc (v) to a valve member (c) to which the coupling disc is rigidly fixed. A control arm (x) is pivoted at (o) with the coupling disc and is subject at one end to centrifugal force acting upon a counterweight (y) and at the other end to a balancing force exerted by a spring (z). A pin (q) extends perpendicularly from the control arm (x) to engage in a hole or recess provided in the gear wheel (g). The coupling disc (v) has a slot (r) in the shape of a quarter moon, which receives the pin (q).

As a result of the above arrangement, the angular position of the valve member (c) relative to the gear wheel (g) varies within limits set by the slot (r) as the control arm (x) pivots under centrifugal force while the valve member (c) rotates. Consequently, the effective exhaust port area is varied relative to the movement of the piston, in speed-dependent fashion. This produces a regulated throttling of the port and consequently a volume of gas that varies with the engine's rotation speed. In this way, the evacuation of exhaust gases can be retarded at low engine speeds, which favors performance at those speeds. When speed increases, the valve timing is adjusted to increase the port's opening, and consequently the volume of exhaust gases increases automatically until it reaches a desired maximum.

FIG. 11 illustrates rotary valve synchronization methods. The rotary valve member accomplishes one cycle by turning only 180 degrees on its own axis and when turning 360 degrees two engines cycles take place. For that reason, the turns between the crank shaft and the rotary valve gear wheel are reduced according to the graphic example shown, where (a) is the crank shaft, (b) the camshaft, (c) the rotary valve, (d) a toothed belt or primary chain and (e) a toothed belt or secondary chain.

Figure 31B:
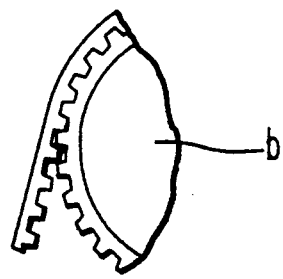
FIGS. 31A and 31B shows one of the possible synchronization arrangements outlined in FIG. 11.
Figure 31A:
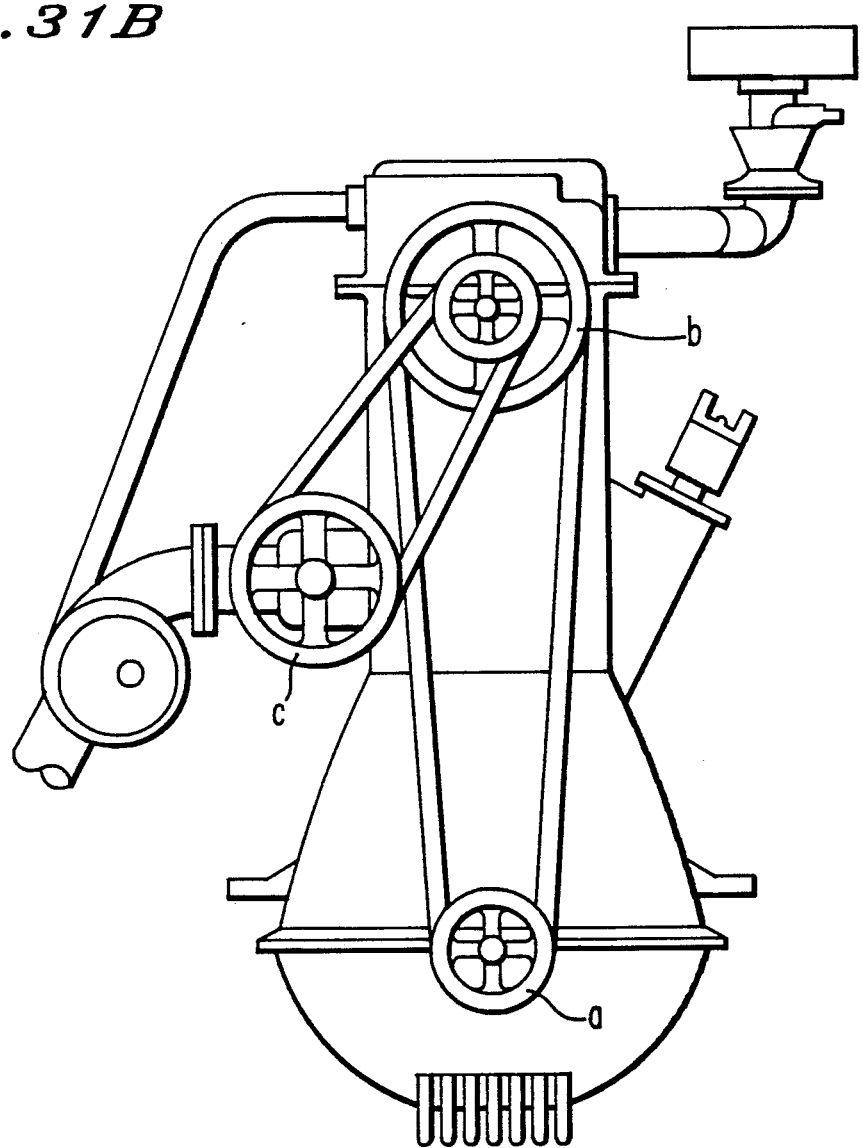

FIG. 31 shows that the crankshaft pulley (a) transmits its movement to the camshaft pulley (b) by means of a toothed belt or chain (d), with a reduction in the rotation speed from 2 to 1. In turn, movement is transmitted to the rotary valve pulley (c) from the inner crankshaft wheel with a similar reduction. Thus, the total reduction ratio is from 4 to 1 between the crank pulley and the rotary valve pulley.

Figure 32:
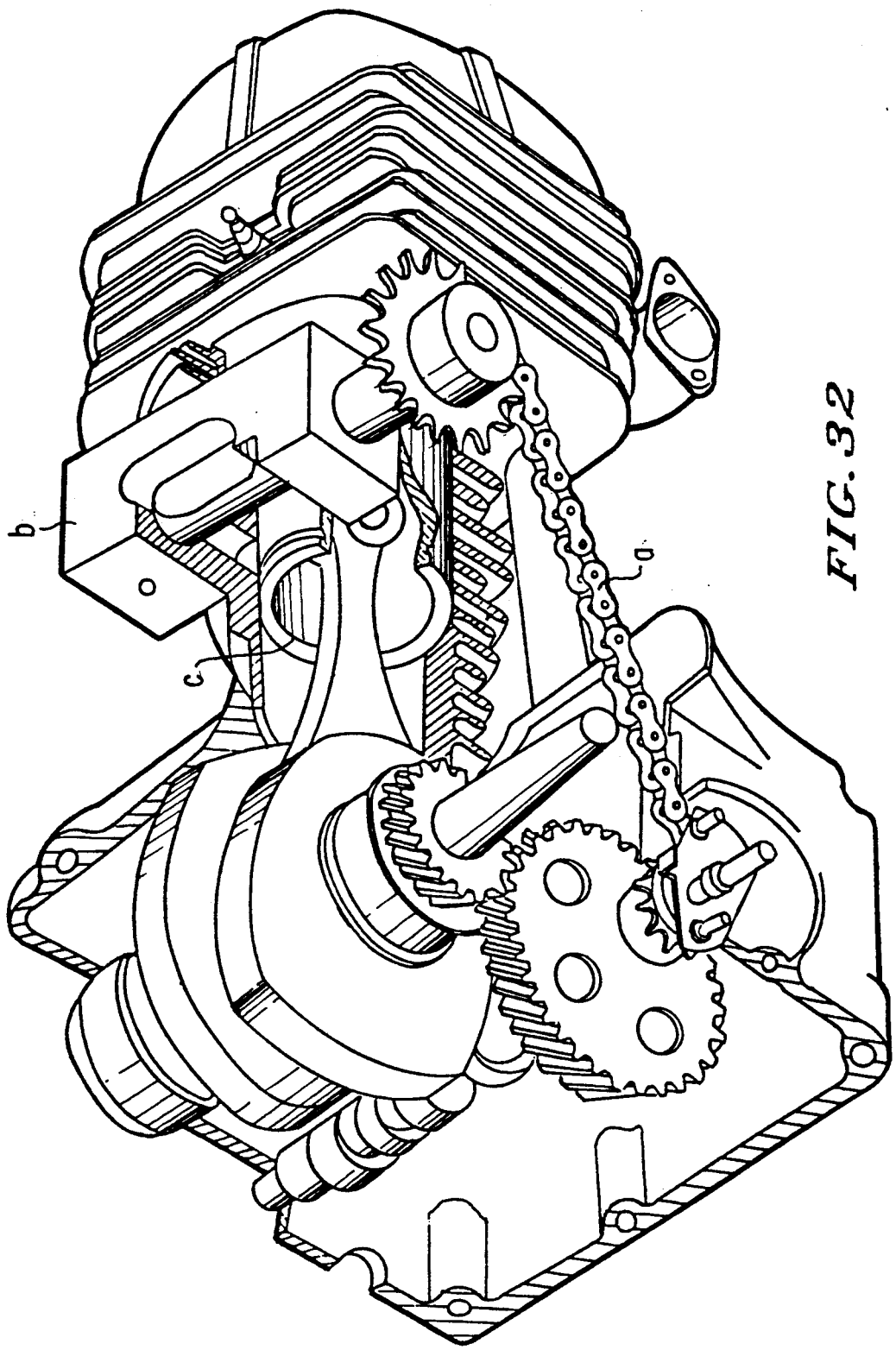
FIG. 32 shows a schematic cutaway view of a single-cylinder engine constructed in accordance with the invention. The control mechanism for the rotary valve can be seen.

FIG. 32 illustrates an engine constructed in accordance with the invention, and having:

a) the transmission of drive shown in FIG. 11.

b) the rotary valve explained in FIGS. 19, 26, 27 and 30; and c) the lengthened piston with its displaced retention ring as shown in FIG. 8.

What is claimed as new and desired to be secured by Letters Patent of the United States is:

1. A four-stroke internal combustion engine, comprising: one or more cylinders each with a piston movable therein to define a combustion chamber; inlet valve means associated with each cylinder for controlling the ingress of air or fuel/air mixture to the combustion chamber during each cycle; and exhaust valve means associated with each cylinder for controlling the egress of exhaust gases from the combustion chamber during each cycle; wherein a port is provided in a wall of each cylinder, the port being openable independently of the inlet valve means and the exhaust valve means to provide an additional route for the ingress of air or fuel/air mixture, and/or to provide an additional route for the egress of exhaust gases, to or from the combustion chamber during each cycle;

wherein the piston has one or more sealing rings positioned to seal the port from the engine's crankcase when the piston is at TDC, the opening of the port is governed by auxiliary valve means and a piston skirt, the auxiliary valve means comprises a rotary valve member rotatably mounted to control flow along a duct, with the rotary valve member having at least one passage therein with passage openings situated to permit flow along the duct intermittently as the rotary valve member rotates in use, and the rotary valve member has at least one exhaust passage for exhaust gases and at least one inlet passage for air or fuel/air mixture, to control flow along both an exhaust duct and an inlet duct.

2. An engine according to claim 1, wherein the opening of the port is governed by the position of the piston within the cylinder, with the port being closed during a part of the cycle in which it is fully covered by the piston.

3. An engine according to claim 2, wherein the piston has one or more sealing rings positioned to seal the port from the combustion chamber when the port is closed.

4. An engine according to claim 1, wherein the rotary valve member is generally cylindrical and wherein the exhaust passage extends diametrically through the rotary valve member to define two exhaust passage openings spaced apart by 180 degrees.

5. An engine according to claim 4, wherein the rotary valve member comprises two inlet passages each defining two inlet passage openings, with the two inlet passage openings of each inlet passage being spaced apart by 90 degrees, and with the total of four inlet passage openings being equispaced about the rotary valve member.

6. An engine according to claim 5, wherein the rotary valve member is arranged such that the rotary valve member turns at one quarter of crankshaft speed;

7. An engine according to claim 6, wherein the port provides an additional route for the egress of exhaust gases and communicates with means for extracting energy from the exhaust gases.

8. An engine according to claim 7, wherein the means for extracting energy from the exhaust gases is a turbine for driving accessories or for driving a compressor for charging the engine.

9. An engine according to claim 8, having means for regulating exhaust gas flow through the port in relation to engine speed.

10. An engine according to claim 9, wherein the regulating means is centrifugally operated and acts to restrict exhaust gas flow as engine speed decreases.

11. An engine according to claim 10, arranged to operate according to the following intake/exhaust cycle: intake via the inlet valve means alone; intake via both the inlet valve means and the port; exhaust via the port alone; exhaust via both the exhaust valve means and the port; and exhaust via the exhaust valve means alone.

* * * * *